(12) United States Patent
Kato et al.

(10) Patent No.: US 11,642,971 B2
(45) Date of Patent: May 9, 2023

(54) ALL-SOLID-STATE BATTERY, ELECTRONIC DEVICE, ELECTRONIC CARD, WEARABLE DEVICE, AND ELECTRIC VEHICLE

(71) Applicant: Murata Manufacturing Co., Ltd., Nagaokakyo (JP)

(72) Inventors: Tomohiro Kato, Nagaokakyo (JP); Keisuke Shimizu, Nagaokakyo (JP); Masamitsu Suzuki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 950 days.

(21) Appl. No.: 16/429,155

(22) Filed: Jun. 3, 2019

(65) Prior Publication Data
US 2019/0288246 A1 Sep. 19, 2019

Related U.S. Application Data

(63) Continuation of application No. PCT/JP2017/041111, filed on Nov. 15, 2017.

(30) Foreign Application Priority Data

Dec. 29, 2016 (JP) .............................. JP2016-257418

(51) Int. Cl.
*H01M 50/131* (2021.01)
*B60L 50/64* (2019.01)
(Continued)

(52) U.S. Cl.
CPC ............... *B60L 50/64* (2019.02); *B60L 15/00* (2013.01); *H01M 4/13* (2013.01); *H01M 4/62* (2013.01); *H01M 10/0562* (2013.01); *H01M 10/0585* (2013.01); *H01M 50/117* (2021.01); *H01M 50/131* (2021.01); *H01M 50/133* (2021.01); *H01M 50/548* (2021.01); *B60K 6/28* (2013.01);
(Continued)

(58) Field of Classification Search
CPC .. H01M 50/116; H01M 50/543; H01M 50/10; H01M 10/0562; H01M 10/0585; H01M 2300/0074; B60L 50/64; B60L 15/00; B60K 6/23; B60Y 220/91; B60Y 2400/112
See application file for complete search history.

(56) References Cited

U.S. PATENT DOCUMENTS 6,445,566 B2 9/2002 Watanabe et al.
8,976,508 B2 3/2015 Tamachi et al.
(Continued)

FOREIGN PATENT DOCUMENTS

JP 2001216952 A 8/2001
JP 2003092092 A 3/2003
(Continued)

OTHER PUBLICATIONS

International Search Report issued in PCT/JP2017/041111, dated Feb. 20, 2018.
(Continued)

*Primary Examiner* — Jane J Rhee
(74) *Attorney, Agent, or Firm* — ArentFox Schiff LLP

(57) ABSTRACT

An all-solid-state battery that includes a battery element and an exterior material covering a surface of the battery element, wherein the exterior material includes one or more glass state materials and one or more crystalline state materials.

19 Claims, 25 Drawing Sheets

(51) Int. Cl.
  *B60L 15/00* (2006.01)
  *H01M 10/0562* (2010.01)
  *H01M 10/0585* (2010.01)
  *H01M 4/62* (2006.01)
  *H01M 4/13* (2010.01)
  *H01M 50/548* (2021.01)
  *H01M 50/133* (2021.01)
  *H01M 50/117* (2021.01)
  *B60K 6/28* (2007.10)
  *H01M 50/553* (2021.01)
  *H01M 50/103* (2021.01)

(52) U.S. Cl.
  CPC ....... *B60Y 2200/91* (2013.01); *B60Y 2200/92* (2013.01); *B60Y 2400/112* (2013.01); *H01M 50/103* (2021.01); *H01M 50/553* (2021.01); *H01M 2300/0074* (2013.01)

(56) References Cited

U.S. PATENT DOCUMENTS

| | | |
|---|---|---|
| 9,680,191 B2 | 6/2017 | Lee et al. |
| 9,755,272 B2 | 9/2017 | Gaben |
| 10,454,092 B2 | 10/2019 | Gaben |
| 2001/0012193 A1 | 8/2001 | Watanabe et al. |
| 2013/0108934 A1 | 5/2013 | Lee et al. |
| 2014/0049878 A1 | 2/2014 | Tamachi et al. |
| 2015/0333376 A1 | 11/2015 | Gaben |
| 2016/0013513 A1 | 1/2016 | Gaben |

FOREIGN PATENT DOCUMENTS

| | | |
|---|---|---|
| JP | 2006351326 A | 12/2006 |
| JP | 2009038552 A | 2/2009 |
| JP | 2013077486 A | 4/2013 |
| JP | 2013098176 A | 5/2013 |
| JP | 2013182679 A | 9/2013 |
| JP | 2016507865 A | 3/2016 |
| JP | 2016511929 A | 4/2016 |
| JP | 2016167356 A | 9/2016 |
| WO | 2012153761 A1 | 11/2012 |

OTHER PUBLICATIONS

Written Opinion of the International Searching Authority issued in PCT/JP2017/041111, dated Feb. 20, 2018.

ALL-SOLID-STATE BATTERY, ELECTRONIC DEVICE, ELECTRONIC CARD, WEARABLE DEVICE, AND ELECTRIC VEHICLE

CROSS REFERENCE TO RELATED APPLICATIONS

The present application is a continuation of International application No. PCT/JP2017/041111, filed Nov. 15, 2017, which claims priority to Japanese Patent Application No. 2016-257418, filed Dec. 29, 2016, the entire contents of each of which are incorporated herein by reference.

FIELD OF THE INVENTION

The present invention relates to an all-solid-state battery, an electronic device, an electronic card, a wearable device, and an electric vehicle.

BACKGROUND OF THE INVENTION

In a lithium ion battery using an electrolytic solution or a gel electrolyte as an electrolyte, a laminate film or a can is used as an exterior material. On the other hand, in an all-solid-state battery using a solid electrolyte as an electrolyte, an exterior material substituting for a laminate film or a can is studied.

Patent Document 1 proposes a solid battery including a power generation element and a protective film covering the power generation element, wherein the protective film includes a filler having an organic resin component and a thermal conductivity of 10 $Wm^{-1} K^{-1}$ or more. With such a solid battery, it is possible to suppress heat generation of the power generation element associated with charging and discharging of the battery, in particular, to reduce degradation of the high-speed charge and discharge cycle characteristics of the battery.

Patent Document 1: Japanese Patent Application Laid-Open No. 2006-351326

SUMMARY OF THE INVENTION

However, in Patent Document 1, since the main component of the protective film (exterior material) is resin, there is a possibility that the effect of suppressing moisture permeation into the power generation element (battery element) is deteriorated.

The object of the present invention is to provide an all-solid-state battery capable of suppressing moisture permeation into a battery element, an electronic device including the all-solid-state battery, an electronic card, a wearable device, and an electric vehicle.

For solving the problem described above, a first embodiment is an all-solid-state battery that includes a battery element and an exterior material covering the surface of the battery element, wherein the exterior material includes one or more glass state materials and one or more crystalline state materials.

Further embodiments include an electronic device, an electronic card, and a wearable device that receive power supply from an all-solid-state battery of the first embodiment.

A still further embodiment is an electric vehicle having an all-solid-state battery of the first embodiment, a conversion device that receives power supply from the all-solid-state battery and converts it to a driving force of the vehicle, and a control device that performs information processing related to vehicle control based on information related to the all-solid-state battery.

According to the present invention, moisture permeation to the battery element can be suppressed. It is to be noted that the effects described herein are not necessarily limited, and any of the effects described in the present disclosure or effects different from those described in the present disclosure may be applied.

DETAILED DESCRIPTION OF THE INVENTION

1 First Embodiment

[Battery Configuration]

Figure 1A:
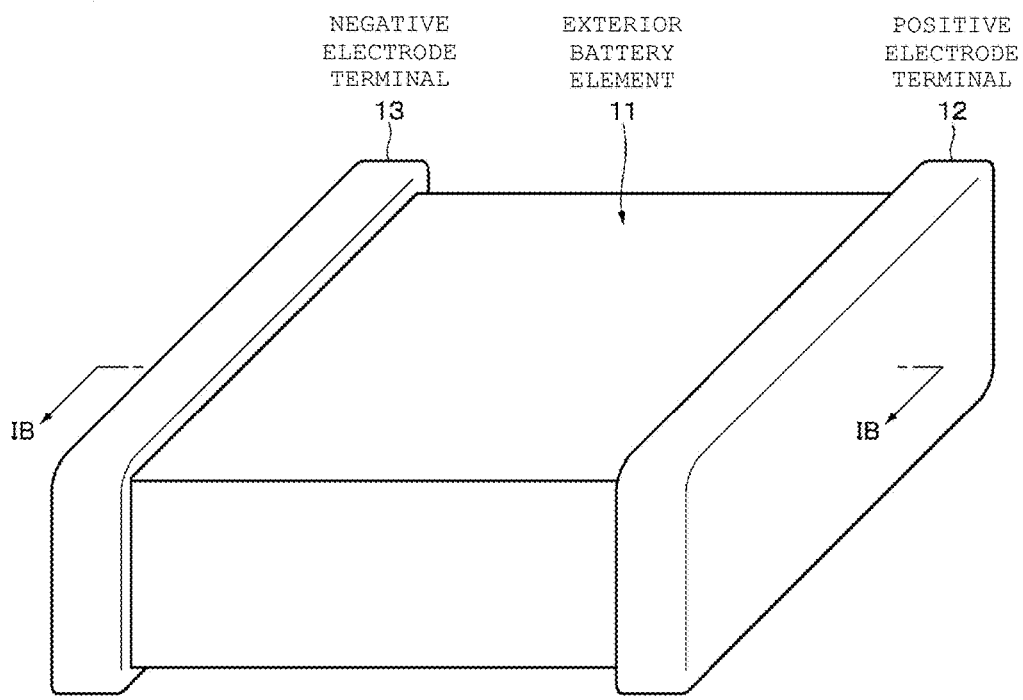
FIG. 1A is a perspective view showing an example of the configuration of an all-solid-state battery according to a first embodiment of the present invention.
Figure 1B:
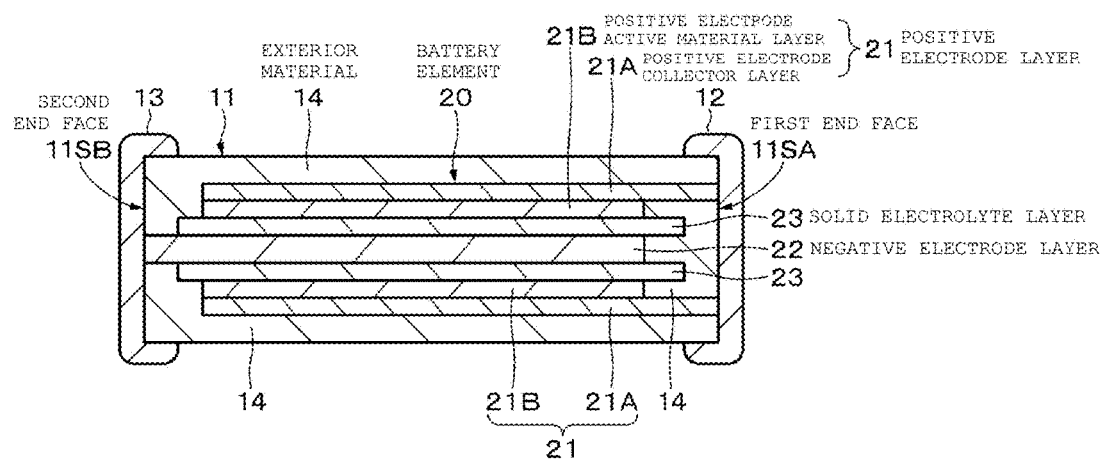
FIG. 1B is a cross-sectional view taken along a line IB-IB of FIG. 1A.

A battery according to the first embodiment of the present invention is a so-called bulk type all-solid-state battery that includes, as shown in FIG. 1A and FIG. 1B, an exterior battery element 11 having a first end face 11SA and a second end face 11SB, which is on the opposite side of the first end face 11SA, a positive electrode terminal 12 provided on the first end face 11SA, and a negative electrode terminal 13 provided on the second end face 11SB. In the first embodiment, the main surface of an exterior battery element 11 has a quadrangular shape. However, the shape of the main surface of the exterior battery element 11 is not limited thereto.

This battery is a secondary battery in which the battery capacity can be repeatedly obtained by exchanging an electrode reactant Li, and it may be a lithium ion secondary battery in which the capacity of the negative electrode can be obtained by occluding and releasing a lithium ion or may be a lithium metal secondary battery in which the capacity of the negative electrode can be obtained by precipitating and dissolving lithium metal.

(Positive Electrode Terminal and Negative Electrode Terminal)

The positive electrode terminal 12 and the negative electrode terminal 13 contain powders of one or more types of conductive grains, for example. The conductive grain may be sintered. The positive electrode terminal 12 and the negative electrode terminal 13 may further contain one or more types of glass or glass ceramics where necessary. The glass or the glass ceramics may be sintered.

Examples of the shape of the conductive grain include sphere-like, ellipsoid-like, needle-like, plate-like, scale-like, tube-like, wire-like, bar-like (rod-like), and irregular shape but it is not particularly limited thereto. Two or more types of grains having the shapes described above may be used in combination.

The conductive grain is a metal grain, a metal oxide grain, or a carbon grain. Here, the metal is defined as including semimetal. Examples of the metal grain include the metal such as copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead, or an alloy thereof, but it is not limited thereto.

Examples of the metal oxide grain include indium tin oxide (ITO), zinc oxide, indium oxide, antimony-added tin oxide, fluorine-added tin oxide, aluminum-added zinc oxide, gallium-added zinc oxide, silicon-added zinc oxide, zinc oxide-tin oxide system, indium oxide-tin oxide system, and zinc oxide-indium oxide-magnesium oxide system, but it is not limited thereto.

Examples of the carbon grain include carbon black, porous carbon, carbon fiber, fullerene, graphene, carbon nanotube, carbon microcoil, and nanohorn, but it is not limited thereto. The glass is, for example, oxide glass. The glass ceramics is, for example, oxide glass ceramics.

(Exterior Battery Element)

As shown in FIG. 1B, the exterior battery element 11 includes a battery element 20 and an exterior material 14 covering the surface of the battery element 20. The battery element 20 is a laminate including two positive electrode layers 21, one negative electrode layer 22, and two solid electrolyte layers 23. The negative electrode layer 22 is provided between the two positive electrode layers 21 and the solid electrolyte layer 23 is provided between the positive electrode layer 21 and the negative electrode layer 22. The positive electrode layer 21 includes a positive electrode collector layer 21A and a positive electrode active material layer 21B provided on the main surface on the side opposite to the negative electrode layer 22 of the both main surfaces of the positive electrode collector layer 21A. The negative electrode layer 22 has both functions of a negative electrode collector layer and a negative electrode active material layer.

Figure 2A:
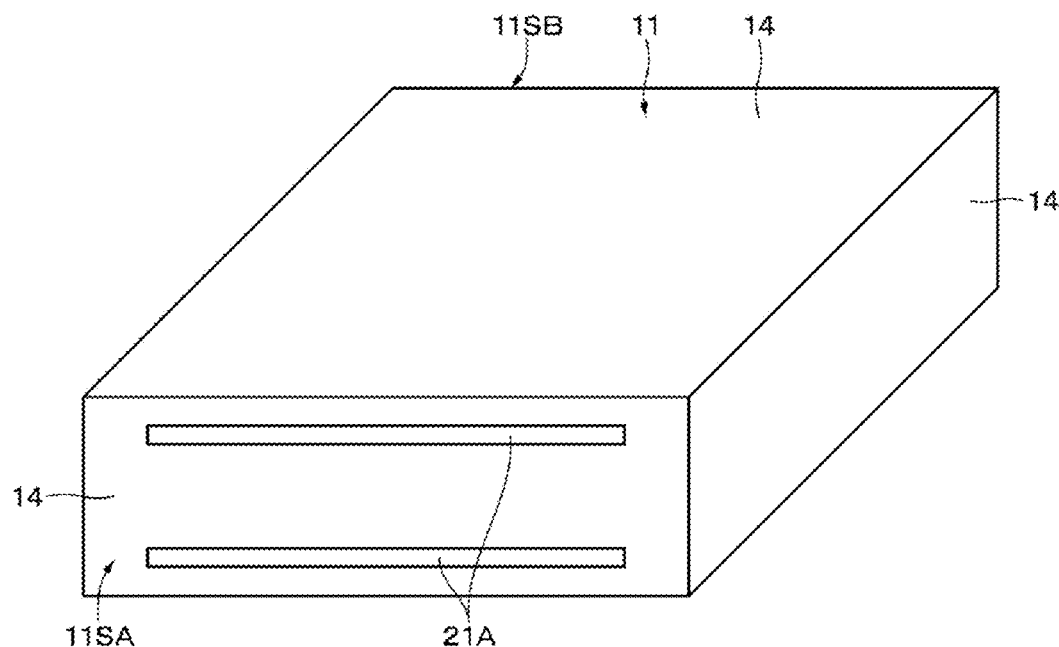
FIG. 2A is a perspective view showing an example of the configuration of a first end face.
Figure 2B:
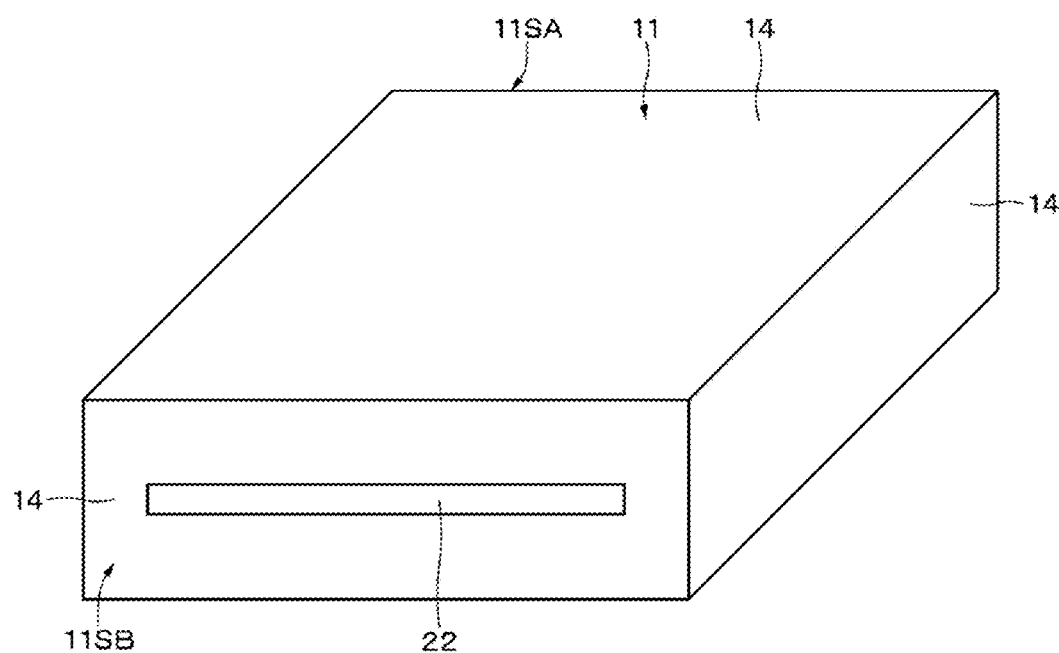
FIG. 2B is a perspective view showing an example of the configuration of a second end face.
Figure 3A:
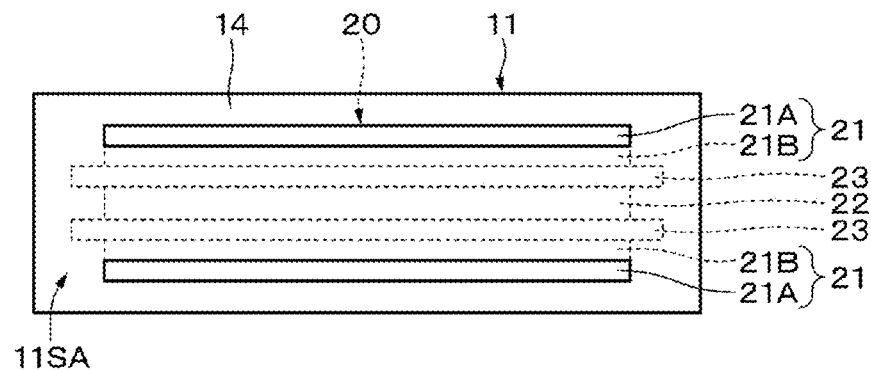
FIG. 3A is a plan view showing an example of the configuration of the first end face.
Figure 3B:
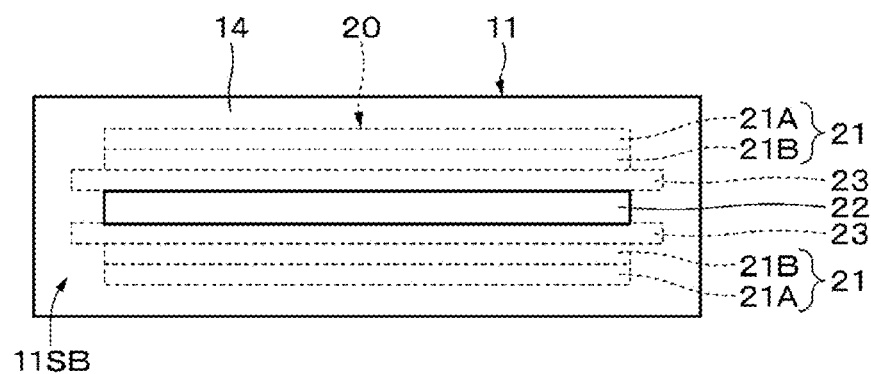
FIG. 3B is a plan view showing an example of the configuration of the second end face.

The exterior material 14 covers the surface of the battery element 20 so that the end portion of the positive electrode collector layer 21A and the end portion of the negative electrode layer 22 are exposed at different end faces of the exterior battery element 11. More specifically, as shown in FIG. 2A and FIG. 3A, the exterior material 14 covers the surface of the battery element 20 so that one end of the positive electrode collector layer 21A is exposed from the first end face 11SA, and, as shown in FIG. 2B and FIG. 3B, one end of the negative electrode layer 22 is exposed from the second end face 11SB. The one end of the positive electrode collector layer 21A exposed from the first end face 11SA is electrically connected to the positive electrode terminal 12. The one end of the negative electrode layer 22 exposed from the second end face 11SB is electrically connected to the negative electrode terminal 13. The surfaces of the exterior battery element 11 other than the first and second end faces 11SA and 11SB are all covered with the exterior material 14.

(Exterior Material)

Figure 4:
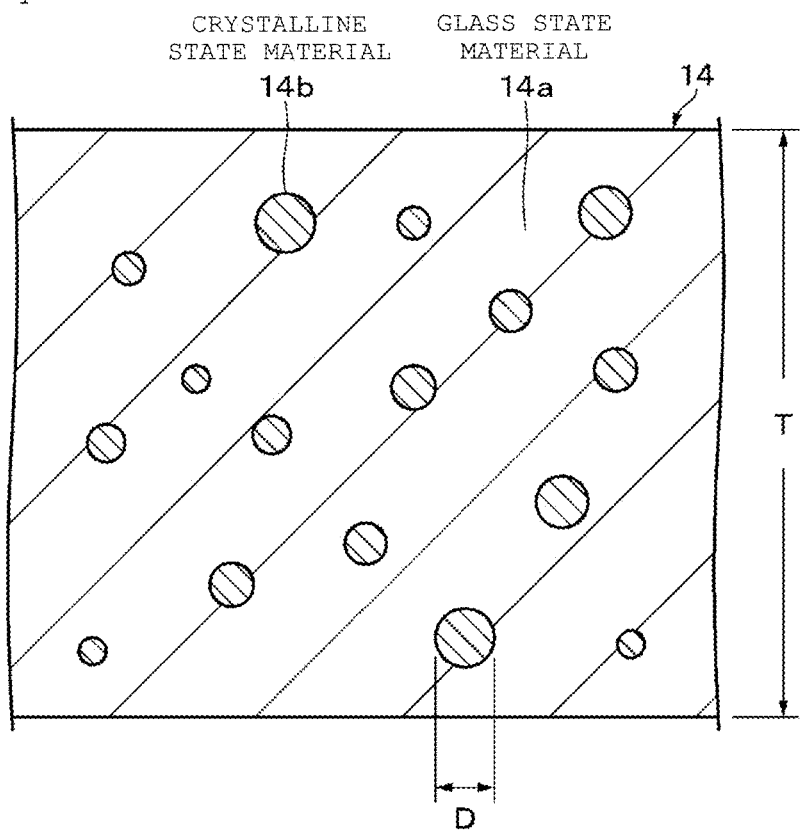
FIG. 4 is an enlarged cross-sectional view showing a part of a cross-section of an exterior material.

As shown in FIG. 4, the exterior material 14 includes one or more types of glass state materials 14a and one or more types of crystalline state materials 14b present in the glass state material 14a. Accordingly, the exterior material 14 has a glass-transition point. It can be confirmed, for example, that the exterior material 14 contains the glass state material 14a and the crystalline state material 14b by preparing a cross-section of the exterior material 14 by ion milling or the like and photographing a cross-sectional SEM image. It can also be confirmed by performing X-ray diffraction, electron beam diffraction, or the like on the cross-section of the exterior material 14 prepared as described above. The exterior material 14 is a fired body of a green sheet as an exterior material precursor, for example.

The crystalline state material 14b has a grain shape. The crystalline state material 14b is preferably dispersed in the glass state material 14b. The glass state material 14b preferably has an average grain size of 10 μm or less. When the average grain size of the glass state material 14b exceeds 10 μm, the average thickness of the exterior material 14 has to exceed 50 μm in order for the exterior material 14 to contain the crystalline state material 14b in a state of being dispersed in the glass state material 14a. This may reduce the energy density of the all-solid-state battery.

The average grain size of the glass state material 14b is determined as follows. First, a cross-section of the exterior material 14 is prepared by ion milling or the like, and a cross-sectional SEM image is photographed. Next, 100 grains (glass state material 14b) are randomly selected from the cross-sectional SEM image, grain sizes D of these grains are measured and simply averaged (arithmetic mean) to determine the average grain size. Here, if the grains are not spherical, the largest one (so-called maximum Feret diameter) of the distances between two parallel lines drawn from all angles so as to be in contact with the outlines of the grains is determined as the grain size of the grain.

The glass state material 14a contains at least one of, for example, B (boron), Bi (bismuth), Te (tellurium), P (phosphorus), V (vanadium), Sn (tin), Pb (lead), and Si (silicon). More specifically, it is an oxide containing at least one of B, Bi, Te, P, V, Sn, Pb, and Si.

The crystalline state material 14b contains at least one of a metal oxide, a metal nitride, and a metal carbide. Here, the metal is defined as including semimetal. More specifically, it contains at least one of $Al_2O_3$ (aluminum oxide: alumina), $SiO_2$ (silicon oxide: quartz), SiN (silicon nitride), AlN (aluminum nitride), and SiC (silicon carbide).

The volume occupancy of the glass state material 14a in the exterior material 14 is preferably 30 vol % or more, more preferably between 30 vol % and 80 vol %, and yet more preferably between 30 vol % and 50 vol %. If the volume occupancy of the glass state material 14a is less than 30 vol %, the amount of the crystalline state material 14b with respect to the glass state material 14a becomes so excessive that a void may be formed in the exterior material 14. On the other hand, when the volume occupancy of the glass state material 14a exceeds 80 vol %, the amount of the crystalline state material 14b with respect to the glass state material 14a becomes so short that an effect of suppressing the shrinkage of the exterior material 14 by the crystalline state material 14b may be deteriorated in the formation process of the exterior material 14.

The volume occupancy of the above-mentioned glass state material 14a is determined as follows. First, a procedure of preparing a cross-section of the battery by ion milling or the like and photographing a cross-section SEM image of the exterior material 14 is repeated to acquire a three-dimensional SEM image. Then, the volume occupancy of the glass state material 14a in a cube having a height of approximately the thickness of the exterior material 14 is determined from the acquired three-dimensional SEM image.

From the viewpoint of improving the atmospheric stability of the all-solid-state battery, the moisture permeability of the exterior material 14 is preferably 1 $g/m^2/day$ or less, more preferably 0.75 $g/m^2/day$ or less, and yet more preferably 0.5 $g/m^2/day$ or less. The moisture permeability of the exterior material 14 is determined as follows. First, a part of the exterior material 14 is taken out as a rectangular plate-like piece from the all-solid-state battery element by ion milling, polishing, or the like. Next, the moisture vapor transmission rate (23° C., 90% RH) of the exterior material 14 is measured in conformity with JIS K 7129-C (ISO 15106-4).

From the viewpoint of suppressing the self-discharge of the all-solid-state battery, the Li ion conductivity of the exterior material 14 is preferably $1\times10^{-8}$ S/cm or less. The Li ion conductivity of the exterior material 14 is determined as follows by the alternating current impedance method. First, a part of the exterior material 14 is taken out as a rectangular plate-like piece from the all-solid-state battery by ion milling, polishing, or the like. Next, a sample is prepared by forming an electrode made of gold (Au) at both end portions of the piece having been taken out. Next, alternating current impedance measurement (frequency: $10^{+6}$ Hz to $10^{-1}$ Hz, Voltage: 100 mV, 1000 mV) is performed on the sample at room temperature (25° C.) using an impedance measuring device (Toyo Technica Co.), thereby creating a Cole-Cole plot.

Subsequently, the ionic conductivity is obtained from this Cole-Cole plot.

From the viewpoint of suppressing self-discharge of the all-solid-state battery, the electric conductivity (electronic conductivity) of the exterior material 14 is preferably $1\times10^{-8}$ S/cm or less. The electric conductivity of the exterior material 14 is determined as follows. First, a sample is prepared in the same manner as the Li ion conductivity measurement method described above. Next, using the prepared sample, the electrical conductivity is determined at room temperature (25° C.) by a two-terminal method.

From the viewpoint of improving the energy density of the all-solid-state battery, the average thickness of the exterior material 14 is preferably 50 μm or less, more preferably 40 μm or less, and still more preferably 30 μm or less. The average thickness of the exterior material 14 is determined as follows. First, a cross-section of the exterior material 14 is prepared by ion milling or the like, and a cross-sectional SEM image is photographed. Next, ten points are randomly selected from the cross-sectional SEM image, a thickness T of the exterior material 14 is measured at each of the points, and these measurement values are simply averaged (arithmetic mean), thereby determining the average thickness of the exterior material 14.

(Solid Electrolyte Layer)

The solid electrolyte layer 23 contains one or more types of solid electrolytes. The solid electrolyte is at least one of oxide glass and oxide glass ceramics, which are lithium ion conductors, and from the viewpoint of improvement of the lithium ion conductivity, oxide glass ceramics is preferable. When the solid electrolyte is at least one of oxide glass and oxide glass ceramics, stability of the solid electrolyte layer 23 against the atmosphere (moisture) can be improved. The solid electrolyte layer 23 is a fired body of a green sheet as a solid electrolyte layer precursor, for example.

Here, glass refers to those being crystallographically amorphous, where a halo is observed in X-ray diffraction, electron beam diffraction, or the like. Glass ceramics (crystallized glass) refers to those being crystallographically amorphous and crystalline mixed, where a peak and a halo are observed in X-ray diffraction, electron beam diffraction, or the like.

The lithium ion conductivity of the solid electrolyte is preferably $10^{-7}$ S/cm or more from the viewpoint of improving the battery performance. The ionic conductivity is a value obtained by the alternating current impedance method as follows. First, the solid electrolyte layer 23 is taken out from the all-solid-state battery element by ion milling, polishing, or the like. Next, a sample is prepared by forming an electrode made of gold (Au) at both surfaces of the solid electrolyte layer 23. Subsequently, alternating current impedance measurement (frequency: $10^{+6}$ Hz to $10^{-1}$ Hz, Voltage: 100 mV, 1000 mV) is performed on the sample at room temperature (25° C.) using an impedance measuring device (Toyo Technica Co.), thereby creating a Cole-Cole plot. Then, the ionic conductivity is obtained from this Cole-Cole plot.

The solid electrolyte contained in the solid electrolyte layer 23 has been sintered. The sintering temperature of oxide glass and oxide glass ceramics, which are solid electrolytes, is preferably 550° C. or less, more preferably between 300° C. and 550° C., and yet more preferably between 300° C. and 500° C.

When the sintering temperature is 550° C. or lower, burn-off of carbon material is suppressed in the firing process (sintering process), so that it is possible to use a carbon material as a negative electrode active material. Accordingly, the energy density of the battery can be further improved. When the positive electrode active material layer 21B contains a conductive agent, a carbon material can be used as the conductive agent. Therefore, it is possible to form a good electronic conduction path in the positive electrode active material layer 21B and improve the conductivity of the positive electrode active material layer 21B. Even when the negative electrode layer 22 contains a conductive agent, a carbon material can be used as the conductive agent, and the conductivity of the negative electrode layer 22 can thus be improved.

When the sintering temperature is 550° C. or lower, it is possible to suppress the formation of by-products such as passivation by reacting the solid electrolyte and the electrode active material in the firing process (sintering process). Accordingly, deterioration of the battery characteristics can be suppressed. In addition, when the firing temperature is as low as 550° C. or lower, the range of choice of the type of the electrode active material is widened, thereby improving the degree of freedom of battery design.

When the sintering temperature is 300° C. or higher, on the other hand, it is possible to burn off the common organic binder such as an acrylic resin contained in the electrode precursor and/or the solid electrolyte layer precursor in the firing process (sintering process).

Oxide glass and oxide glass ceramics preferably have a sintering temperature of 550° C. or less, a high thermal shrinkage ratio, and a rich fluidity. This is because the following effects are obtained. That is, it is possible to suppress the reaction between the solid electrolyte layer 23 and the positive electrode active material layer 21B and the reaction between the solid electrolyte layer 23 and the negative electrode layer 22. Further, a good interface is formed between the positive electrode active material layer 21B and the solid electrolyte layer 23 and between the negative electrode layer 22 and the solid electrolyte layer 23, and it is hence possible to reduce the interface resistance between the positive electrode active material layer 21B and the solid electrolyte layer 23 and between the negative electrode layer 22 and the solid electrolyte layer 23.

As oxide glass and oxide glass ceramics, those containing at least one of Ge (germanium), Si (silicon), B (boron), and P (phosphorus), Li (lithium), and O (Oxygen) are preferable, and those containing Si, B, Li, and O are more preferable. Specifically, those containing at least one of germanium oxide ($GeO_2$), silicon oxide ($SiO_2$), boron oxide ($B_2O_3$), and phosphorus oxide ($P_2O_5$) and lithium oxide ($Li_2O$) are preferable, and those containing $SiO_2$, $B_2O_3$, and $Li_2O$ are more preferable. As described above, oxide glass and oxide glass ceramics containing at least one of Ge, Si, B, and P, Li, and O have a sintering temperature between 300° C. and 550° C., have a high thermal shrinkage ratio, and are rich in fluidity, and hence it is advantageous from the viewpoint of reduction in interface resistance, improvement in energy density of the battery, and the like.

From the viewpoint of lowering the sintering temperature of the solid electrolyte, the content of $Li_2O$ is preferably between 20 mol % and 75 mol %, more preferably between 30 mol % and 75 mol %, yet more preferably between 40 mol % and 75 mol %, and particularly preferably between 50 mol % and 75 mol %.

When the solid electrolyte contains $GeO_2$, the content of $GeO_2$ is preferably greater than 0 mol % and equal to or less than 80 mol %. When the solid electrolyte contains $SiO_2$, the content of $SiO_2$ is preferably greater than 0 mol % and equal to or less than 70 mol %. When the solid electrolyte contains $B_2O_3$, the content of $B_2O_3$ is preferably greater than 0 mol % and equal to or less than 60 mol %. When the solid electrolyte contains $P_2O_5$, the content of $P_2O_5$ is preferably greater than 0 mol % and equal to or less than 50 mol %.

The content of each of the oxides described above is the content of each of the oxides in a solid electrolyte. Specifically, the proportion of the content (mol) of each of the oxides with respect to the total amount (mol) of one or more of $GeO_2$, $SiO_2$, $B_2O_3$, and $P_2O_5$ and $Li_2O$ is shown as a percentage (mol %). The content of each of the oxides can be measured using inductively coupled plasma atomic emission spectroscopy (ICP-AES) or the like.

The solid electrolyte may further contain an additional element if necessary. The additional elements include at least one selected from the group consisting of Na (sodium), Mg (magnesium), Al (aluminum), K (potassium), Ca (calcium), Ti (titanium), V (vanadium), Cr (chromium), Mn (manganese), Fe (iron), Co (cobalt), Ni (nickel), Cu (copper), Zn (zinc), Ga (gallium), Se (selenium), Rb (rubidium), S (sulfur), Y (yttrium), Zr (zirconium), Nb (niobium), Mo (molybdenum), Ag (silver), In (indium), Sn (tin), Sb (antimony), Cs (cesium), Ba (vanadium), Hf (hafnium), Ta (tantalum), W (tungsten), Pb (lead), Bi (bismuth), Au (gold), La (lanthanum), Nd (neodymium), and Eu (europium), for example. The solid electrolyte may contain, as an oxide, at least one selected from the group consisting of these additional elements.

(Positive Electrode Collector Layer)

The positive electrode collector layer 21A contains one or more types of conductive grains and one or more types of solid electrolytes. The positive electrode collector layer 21A is a fired body of a green sheet as a positive electrode collector layer precursor, for example.

The conductive grain is the same as that contained in the positive electrode terminal 12 and the negative electrode terminal 13 described above. The solid electrolyte is the same as that contained in the solid electrolyte layer 23 described above. However, the composition (type of material) or the composition ratio of the solid electrolyte contained in the solid electrolyte layer 23 and the positive electrode collector layer 21A may be the same or may be different.

The positive electrode collector layer 21A may be a metal layer containing, for example, Al, Ni, stainless steel, and the like. The shape of the metal layer is, for example, a foil shape, a plate shape, a mesh shape, or the like.

(Positive Electrode Active Material Layer)

The positive electrode active material layer 21B contains one or more types of positive electrode active materials and one or more types of solid electrolytes. The solid electrolyte may have a function as a binder. The positive electrode active material layer 21B may further contain a conductive agent, if necessary. The positive electrode active material layer 21B is a fired body of a green sheet as a positive electrode active material layer precursor, for example.

The positive electrode active material contains, for example, a positive electrode material capable of occluding and releasing a lithium ion, which is an electrode reactant. From the viewpoint of obtaining a high energy density, the positive electrode material is preferably a lithium-containing compound or the like but not limited thereto. The lithium-containing compound is, for example, a composite oxide (lithium transition metal composite oxide) containing lithium and a transition metal element as constituent elements, a phosphate compound (lithium transition metal phosphate compound) containing lithium and a transition metal element as constituent elements, and the like. Among them, the transition metal element is preferably any one or more of Co, Ni, Mn, and Fe. Due to this, when a higher voltage is obtained and the voltage of the battery can be increased, the energy (Wh) of the battery having the same capacity (mAh) can be increased.

The lithium transition metal composite oxide is expressed by, for example, $Li_xM1O_2$, $Li_yM2O_4$, or the like. More specifically, for example, the lithium transition metal composite oxide is $LiCoO_2$, $LiNiO_2$, $LiVO_2$, $LiCrO_2$, $LiMn_2O_4$, or the like. Further, the lithium transition metal phosphate compound is expressed by, for example, $Li_zM3PO_4$ or the like. More specifically, for example, the lithium transition metal phosphate compound is $LiFePO_4$, $LiCoPO_4$, or the like. However, M1 to M3 are one or more types of transition metal elements, and the values of x to z are arbitrary.

In addition to this, the positive electrode active material may be, for example, an oxide, a disulfide, a chalcogenide, a conductive polymer, or the like. The oxide is, for example, titanium oxide, vanadium oxide, manganese dioxide, or the like. The disulfide is, for example, titanium disulfide, molybdenum sulfide, or the like. The chalcogenide is, for example, niobium selenide or the like. Examples of the conductive polymer are disulfide, polypyrrole, polyaniline, polythiophene, polyparastylene, polyacetylene, polyacene, or the like.

The solid electrolyte is the same as that contained in the solid electrolyte layer 23 described above. However, the composition (type of material) or the composition ratio of the solid electrolyte contained in the solid electrolyte layer 23 and the positive electrode active material layer 21B may be the same or may be different.

The conductive agent is, for example, at least one of a carbon material, a metal, a metal oxide, a conductive polymer, and the like. As the carbon material, for example, at least one of graphite, carbon fiber, carbon black, carbon nanotube, and the like can be used. As the carbon fiber, for example, vapor growth carbon fiber (VGCF) or the like can be used. As the carbon black, for example, at least one of acetylene black, Ketjenblack, and the like can be used. As the carbon nanotube, for example, a single-wall carbon nanotube (SWCNT), a multi-wall carbon nanotube (MWCNT) such as a double-wall carbon nanotube (DWCNT), or the like can be used. As the metal, for example, Ni powder or the like can be used. As the metal oxide, for example, $SnO_2$ or the like can be used. As the conductive polymer, for example, at least one of substituted or unsubstituted polyaniline, polypyrrole, polythiophene, (co)polymers composed of one or two selected from these, and the like can be used. Note that the conductive agent may be a material having conductivity, and is not limited to the above examples.

(Negative Electrode Layer)

The negative electrode layer 22 is a negative electrode active material layer containing one or more types of negative electrode active materials and one or more types of solid electrolytes. The solid electrolyte may have a function as a binder. The negative electrode layer 22 may further contain a conductive agent, if necessary. The negative electrode layer 22 is a fired body of a green sheet as a negative electrode layer precursor, for example.

The negative electrode active material contains, for example, a negative electrode material capable of occluding and releasing a lithium ion, which is an electrode reactant. From the viewpoint of obtaining a high energy density and a high electrical conductivity, the negative electrode material is preferably a carbon material, but is not limited thereto.

The carbon material is, for example, at least one of graphitizable carbon, non-graphitizable carbon, graphite, mesocarbon microbead (MCMB), highly oriented pyrolytic graphite (HOPG), and the like.

The solid electrolyte is the same as that contained in the solid electrolyte layer 23 described above. However, the composition (type of material) or the composition ratio of the solid electrolyte contained in the solid electrolyte layer 23 and the negative electrode layer 22 may be the same or may be different.

The conductive agent is the same as the conductive agent in the above-described positive electrode active material layer 21B.

[Battery Operation]

In this battery, for example, at the time of charging, a lithium ion released from the positive electrode active material layer 21B is taken into the negative electrode layer 22 via the solid electrolyte layer 23, and at the time of discharging, a lithium ion released from the negative electrode layer 22 is taken into the positive electrode active material layer 21B via the solid electrolyte layer 23.

[Method for Manufacturing Battery]

Next, an example of a method for manufacturing a battery according to the first embodiment of the present invention will be described.

(Formation Process of Positive Electrode Active Material Layer Precursor)

A green sheet as a positive electrode active material layer precursor is formed in the following manner. First, a positive electrode active material, a solid electrolyte, an organic binder, and, if necessary, a conductive agent are mixed to prepare a mixture powder, and then this mixture powder is dispersed in a solvent, thereby obtaining a paste as a green sheet forming composition. In order to improve the dispersibility of the mixture powder, the dispersion may be carried out several times.

As the organic binder, for example, an acrylic resin or the like can be used. While the solvent is not particularly limited as long as it can disperse the mixture powder, the one that burns off in a temperature range lower than the firing temperature of the green sheet is preferable. As the solvent, for example, lower alcohols having 4 or less carbon atoms such as methanol, ethanol, isopropanol, n-butanol, sec-butanol, and t-butanol, aliphatic glycols such as ethylene glycol, propylene glycol (1,3-propanediol), 1,3-propanediol, 1,4-butanediol, 1,2-butanediol, 1,3-butanediol, and 2-methyl-1,3-propanediol, ketones such as methyl ethyl ketone, amines such as dimethylethylamine, alicyclic alcohols such as terpineol, and the like can be used alone or in a mixture of two or more, but it is not particularly limited thereto. Examples of the dispersion method include agitation treatment, ultrasonic dispersion treatment, bead dispersion treatment, kneading treatment, and homogenizer treatment.

Next, if necessary, foreign substances in the paste may be removed by filtering the paste with a filter. Next, if necessary, vacuum degassing may be performed on the paste to remove internal bubbles.

Next, the paste is uniformly applied or printed on the surface of the supporting substrate to form a paste layer. As the supporting substrate, for example, a polymer resin film such as polyethylene terephthalate (PET) or the like can be used. As the application and printing methods, use of a simple method suitable for mass productivity is preferable. As the application method, for instance, a die coating method, a micro gravure coating method, a wire bar coating method, a direct gravure coating method, a reverse roll coating method, a comma coating method, a knife coating method, a spray coating method, a curtain coating method, a dipping method, a spin coating method, or the like can be used, but it is not particularly limited thereto. As a printing method, for example, a relief printing method, an offset printing method, a gravure printing method, an intaglio printing method, a rubber plate printing method, a screen printing method, or the like can be used, but it is not particularly limited thereto.

In order to facilitate peeling of the green sheet from the surface of the supporting substrate in the post-process, it is preferable to apply peeling treatment to the surface of the supporting substrate beforehand. Examples of the peeling treatment include a method of applying or printing on the surface of the supporting substrate beforehand a composition that imparts the peeling property. Examples of the composition that imparts the peeling property include a paint containing a binder as a main component and to which wax, fluorine, or the like is added and a silicone resin.

Next, the green sheet is formed on the surface of the supporting substrate by drying the paste layer. Examples of the drying method include air drying by natural drying, hot air, and the like, heat drying by infrared ray, far-infrared ray, and the like, and vacuum drying. These drying methods may be used alone or in combination of two or more.

(Formation Process of Positive Electrode Collector Layer Precursor)

A green sheet as a positive electrode collector layer precursor is formed in the following manner. First, a powder of conductive grains, a solid electrolyte, and an organic binder are mixed to prepare a mixture powder, and then this mixture powder is dispersed in a solvent, thereby obtaining a paste as a green sheet forming composition. The green sheet is obtained in the same manner as the above-mentioned "Formation Process of Positive Electrode Active Material Layer Precursor" except for using this paste.

(Formation Process of Negative Electrode Layer Precursor)

A green sheet as a negative electrode layer precursor is formed in the following manner. First, a negative electrode active material, a solid electrolyte, an organic binder, and, if necessary, a conductive agent are mixed to prepare a mixture powder, and then this mixture powder is dispersed in a solvent, thereby obtaining a paste as a green sheet forming composition. The green sheet is obtained in the same manner as the above-mentioned "Formation Process of Positive Electrode Active Material Layer Precursor" except for using this paste.

(Formation Process of Solid Electrolyte Layer Precursor)

A green sheet as a solid electrolyte layer precursor is formed in the following manner. First, a solid electrolyte and an organic binder are mixed to prepare a mixture powder, and then this mixture powder is dispersed in a solvent, thereby obtaining a paste as a green sheet forming composition. The green sheet is obtained in the same manner as the above-mentioned "Formation Process of Positive Electrode Active Material Layer Precursor" except for using this paste.

(Formation Process of Exterior Material Precursor)

A green sheet as an exterior material precursor is formed in the following manner. First, the glass state material 14a, the crystalline state material 14b, and an organic binder are mixed to prepare a mixture powder, and then this mixture powder is dispersed in a solvent, thereby obtaining a paste as a green sheet forming composition. The green sheet is obtained in the same manner as the above-mentioned "Formation Process of Positive Electrode Active Material Layer Precursor" except for using this paste.

(Lamination and Firing Process of Precursor)

Using two layers of green sheets for forming the positive electrode active material layers, two layers of green sheets for forming the positive electrode collector layers, one layer of green sheet for forming the negative electrode layer, and two layers of green sheets for forming the solid electrolyte layers obtained as described above, a battery is produced as follows. First, each of the green sheets is peeled from a supporting substrate and cut into a predetermined size and shape, and then the above-described six green sheets are laminated to form a laminate.

Next, the laminate is heated, and at the same time, the laminate is pressed so that pressure is applied at least in the thickness direction of the laminate. As a result, the organic binder contained in each of the green sheets constituting the laminate is melted, and the green sheets constituting the laminate are closely adhered to each other. Examples of a specific method of pressing the laminate while heating it include a hot press method and a warm isostatic press (WIP) method. Subsequently, the organic binder is degreased by applying heat to the laminate so that the laminate has a temperature equal to or higher than the oxidation combustion temperature of the organic binder contained in each of the green sheets. Thereafter, the laminate is fired to sinter the solid electrolyte contained in each of the green sheets.

Note that the solid electrolyte contained in the green sheets for forming the positive electrode active material layers, the green sheets for forming the positive electrode collector layers, the green sheet for forming the negative electrode layer, and the green sheets for forming the solid electrolyte layers is at least one of oxide glass and oxide glass ceramics before the firing process. As described above, the oxide glass and the oxide glass ceramics preferably have a sintering temperature of 550° C. or less, a high thermal shrinkage ratio, and a rich fluidity.

The firing temperature of the laminate is equal to or higher than the sintering temperature of the solid electrolyte, preferably between the sintering temperature of the solid electrolyte and 550° C., and more preferably between the sintering temperature of the solid electrolyte and 500° C. Here, the sintering temperature of the solid electrolyte refers to the sintering temperature of the solid electrolyte when the laminate contains only one type of solid electrolyte. On the other hand, it refers to the minimum temperature of the sintering temperatures of those solid electrolytes when the laminate contains two or more types of solid electrolytes.

When the firing temperature of the laminate is equal to or higher than the sintering temperature of the solid electrolyte, the sintering of the solid electrolyte proceeds, and hence the lithium ion conductivity of the positive electrode layer 21, the negative electrode layer 22, and the solid electrolyte layer 23 can be improved. In addition, the strength of the positive electrode layer 21, the negative electrode layer 22, and the solid electrolyte layer 23 can be increased. The reason for setting the firing temperature of the laminate to 550° C. or lower or 500° C. or lower is the same as the reason for setting the sintering temperature of the solid electrolyte to 550° C. or lower or 500° C. or lower.

In the case where the solid electrolyte contained in the laminate before the firing process is oxide glass, it may be changed from oxide glass to oxide glass ceramics in the firing process. Thus, the target battery element 20 is obtained.

(Formation Process of Exterior Material)

The exterior material 14 is formed on the surface of the battery element 20 as follows. First, the surface of the battery element 20 is covered with the green sheet for forming the exterior material. At this time, the green sheet covers the surface of the battery element 20 such that one end of the positive electrode collector layer 21A is exposed from the first end face 11SA and one end of the negative electrode layer 22 is exposed from the second end face 11SB.

Next, the organic binder is degreased by applying heat to the green sheet so that the green sheet has a temperature equal to or higher than the oxidation combustion temperature of the organic binder contained in the green sheet. After degreasing, heat is applied to the green sheet at a sintering temperature equal to or higher than the softening point of the glass state material 14a, thereby sintering the glass state material 14a contained in the green sheet. Due to this, the exterior battery element 11 is obtained.

(Forming Process of Terminal)

A conductive paste containing a conductive grain is applied to the first and second end faces 11SA and 11SB of the exterior battery element 11, and then the conductive paste is fired. Due to this, the positive electrode and negative electrode terminals 12 and 13 are formed so as to cover the first and second end faces 11SA and 11SB, respectively. Thus, the all-solid-state battery shown in FIG. 1A and FIG. 1B is obtained.

[Effects]

In the all-solid-state battery according to the first embodiment, the surface of the battery element 20 is covered with the exterior material 14 containing the glass state material 14a, and it is hence possible to suppress moisture permeation to the battery element 20. Accordingly, the atmospheric stability of the all-solid-state battery can be improved.

In addition, the exterior material 14 further contains the crystalline state material 14b in addition to the glass state material 14a, and it is hence possible to suppress shrinkage of the exterior material 14 in the formation process of the exterior material 14 and to reduce a difference in shrinkage ratio between the battery element 20 and the exterior material 14. Accordingly, it is possible to suppress the exterior material 14 from getting distorted and cracked in the formation process the exterior material 14.

While a laminate film can be used as an exterior material of the all-solid-state battery, the laminate film has a seal portion and hence the volume energy density of the all-solid-state battery becomes reduced. On the other hand, in the all-solid-state battery according to the first embodiment, the exterior material 14 containing the glass state material 14a is used as the exterior material, and it is hence possible to eliminate the seal portion as in the laminate film. Accordingly, the volume energy density of the all-solid-state battery can be improved.

While a resin mold can be used as an exterior material of the all-solid-state battery, the resin mold is a material prone to moisture permeation, and it is hence necessary to thicken the resin mold in order to suppress moisture permeation. Therefore, in a case where a resin mold is used as the exterior material, the volume energy density of the all-solid-state battery may decrease if moisture permeation is suppressed. On the other hand, in the all-solid-state battery according to the first embodiment, the exterior material 14 containing the glass state material 14a is used, and it is hence possible to sufficiently suppress moisture permeation to the battery element 20 even if the exterior material 14 is not thickened.

In addition, if a laminate film or a resin mold is used as the exterior material of the all-solid-state battery, it is difficult to mount the all-solid-state battery on the module substrate by reflow. On the other hand, in the all-solid-state battery according to the first embodiment, the exterior material 14 includes the glass state material 14a and the crystalline state material 14b, it is hence possible to mount the all-solid-state battery on the module substrate by reflow.

[Variation]

(Variation 1)

The exterior material 14 may be formed as follows using a paste.

(Preparation Process of External Material Forming Paste)

An exterior material forming paste is prepared as follows. First, the glass state material 14a, the crystalline state material 14b, and an organic binder are mixed to prepare a mixture powder. Next, this mixture powder is dispersed in a solvent, thereby obtaining a paste as an exterior material forming composition.

(Formation Process of Exterior Material)

The exterior material 14 is formed on the surface of the battery element 20 as follows. First, the exterior material forming paste is applied to the surface of the battery element 20 by a printing method. At this time, the paste is applied to the surface of the battery element 20 such that one end of the positive electrode collector layer 21A is exposed from the first end face 11SA and one end of the negative electrode layer 22 is exposed from the second end face 11SB. As a printing method, for example, flexographic printing, screen printing, gravure printing, gravure offset printing, reverse offset printing, waterless planographic printing, ink-jet printing, or the like can be used, but it is not limited thereto.

Next, the organic binder contained in the paste is degreased by applying heat to the paste so that the paste has a temperature equal to or higher than the oxidation combustion temperature of the organic binder contained in the paste. After degreasing, heat is applied to the paste at a sintering temperature equal to or higher than the softening point of the glass state material 14a, thereby sintering the glass state material 14a contained in the paste. Due to this, the exterior battery element 11 is obtained.

(Variation 2)

In the first embodiment, the example of the battery element 20 configured to include the two positive electrode layers 21, the one negative electrode layer 22, and the two solid electrolyte layers 23 was explained. However, the battery element 20 may have a configuration in which the positive electrode layer 21 and the negative electrode layer 22 are laminated via the solid electrolyte layer 23, and the numbers of layers of the positive electrode layer 21, the negative electrode layer 22, and the solid electrolyte layer 23 are not particularly limited.

Figure 5:
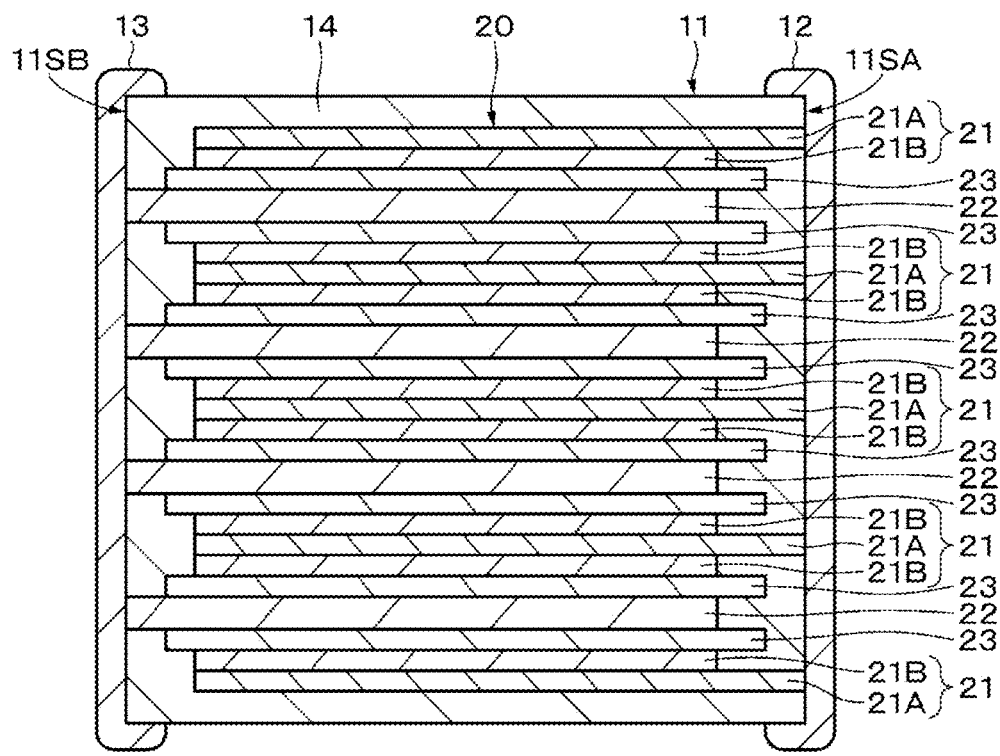
FIG. 5 is a cross-sectional view showing an example of the configuration of an all-solid-state battery according to a variation of the first embodiment of the present invention.

FIG. 5 shows an example of the configuration in which the battery element 20 includes the five positive electrode layers 21, the four negative electrode layers 22, and the eight solid electrolyte layers 23. Among the five positive electrode layers 21, the positive electrode layer 21 positioned at each end of the battery element 20 includes the positive electrode collector layer 21A and the positive electrode active material layer 21B provided on the main surface on the side opposite to the negative electrode layer 22 of the both main surfaces of the positive electrode collector layer 21A. Among the five positive electrode layers 21, the positive electrode layers 21 other than those positioned at the both ends of the battery element 20 each include the positive electrode collector layer 21A and the positive electrode active material layer 21B provided on each of the main surfaces of the positive electrode collector layer 21A.

Figure 6A:
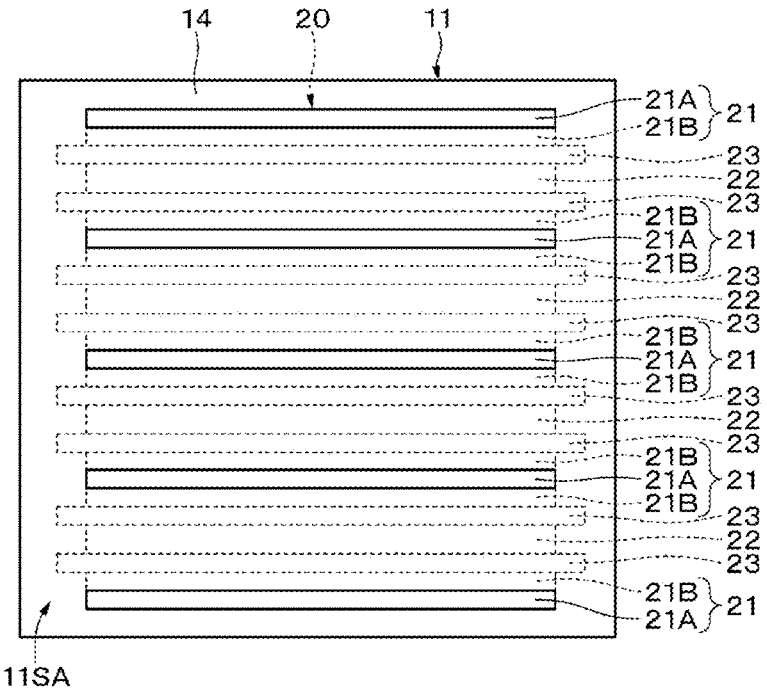
FIG. 6A is a plan view showing an example of the configuration of the first end face.
Figure 6B:
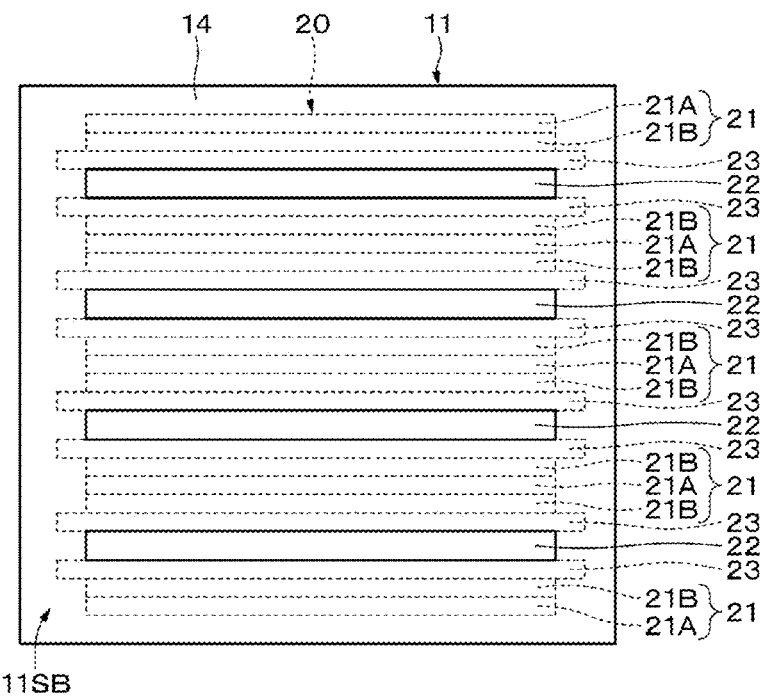
FIG. 6B is a plan view showing an example of the configuration of the second end face.

As shown in FIG. 6A, one end of the five positive electrode collector layers 21A is exposed from the first end face 11SA. The positive electrode terminal 12 is electrically connected to the exposed one end of the five positive electrode collector layers 21A. On the other hand, as shown in FIG. 6B, one end of the four negative electrode layers 22 is exposed from the second end face 11SB. The negative electrode terminal 13 is electrically connected to the exposed one end of the four negative electrode layers 22.

(Variation 3)

In the first embodiment, the case in which the main surface of the exterior battery element 11 had a quadrangular shape was explained as an example. However, the shape of the main surface of the exterior battery element 11 is not limited thereto. Examples thereof include a circle, an ellipse, a polygon other than a quadrangular shape, an irregular shape, and the like. Also, the shape of the exterior battery element 11 is not limited to a plate shape, and it may be a sheet shape or a block shape. Further, the exterior battery element 11 may be curved or bent.

(Variation 4)

While in the above-described first embodiment, an example in which the present invention is applied to a battery using lithium as an electrode reactant has been described, the present invention is not limited to this example. The present invention may be applied to a battery using, for example, another alkali metal such as Na or K, an alkaline earth metal such as Mg or Ca, or another metal such as Al or Ag as the electrode reactant.

(Variation 5)

The battery may have a bipolar type laminate structure. Further, instead of constituting all layers of the battery by green sheets, some layers constituting the battery may be formed by green sheets, and other layers may be directly formed on the green sheets by printing or the like.

Specifically, for example, the positive electrode collector layer precursor, the positive electrode active material layer precursor, and the negative electrode layer precursor may be formed in the following manner. First, a paste for forming the positive electrode active material layer is applied or printed on one surface of the solid electrolyte layer precursor or the solid electrolyte layer 23, and then dried to form the positive electrode active material layer precursor. Next, a paste for forming the positive electrode collector layer is applied or printed on the positive electrode active material layer precursor, and then dried to form the positive electrode collector layer precursor. Thereafter, a paste for forming the negative electrode layer may be applied or printed on the other surface of the solid electrolyte layer precursor or the solid electrolyte layer 23, and then dried to form the negative electrode layer precursor.

(Variation 6)

While in the above-described first embodiment, the case where the positive electrode collector layer precursor, the positive electrode active material layer precursor, the negative electrode layer precursor, and the solid electrolyte layer precursor are green sheets was described as an example, at least one of the positive electrode collector layer precursor, the positive electrode active material layer precursor, the negative electrode layer precursor, and the solid electrolyte layer precursor may be a green compact. The green compact may not contain an organic binder.

(Variation 7)

While in the above-described first embodiment, the case where both of the positive electrode active material layer 21B and the negative electrode layer 22 include a solid electrolyte was described as an example, at least one of the positive electrode active material layer 21B and the negative electrode layer 22 may not contain a solid electrolyte. In this case, the layer not including the solid electrolyte may be a thin film produced by a vapor growth method such as a vapor deposition method or a sputtering method.

(Variation 8)

The solid electrolyte contained in the positive electrode collector layer 21A, the positive electrode active material layer 21B, the negative electrode layer 22, and the solid electrolyte layer 23 is not particularly limited. As those other than the solid electrolyte of the first embodiment, for example, a perovskite type oxide crystal composed of La—Li—Ti—O and the like, a garnet type oxide crystal composed of Li—La—Zr—O and the like, a phosphate compound (LATP) containing lithium, aluminum, and titanium as constituent elements, and a phosphate compound (LAGP) containing lithium, aluminum, and germanium as constituent elements can be used.

In addition, sulfides such as $Li_2S$—$P_2S_5$, $Li_2S$—$SiS_2$—$Li_3PO_4$, $Li_7P_3S_{11}$, $Li_{3.25}Ge_{0.25}P_{0.75}S$, and $Li_{10}GeP_2S_{12}$, and oxides such as $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, and $La_{2/3-x}Li_{3x}TiO_3$ can also be used.

2 Second Embodiment

Figure 7A:
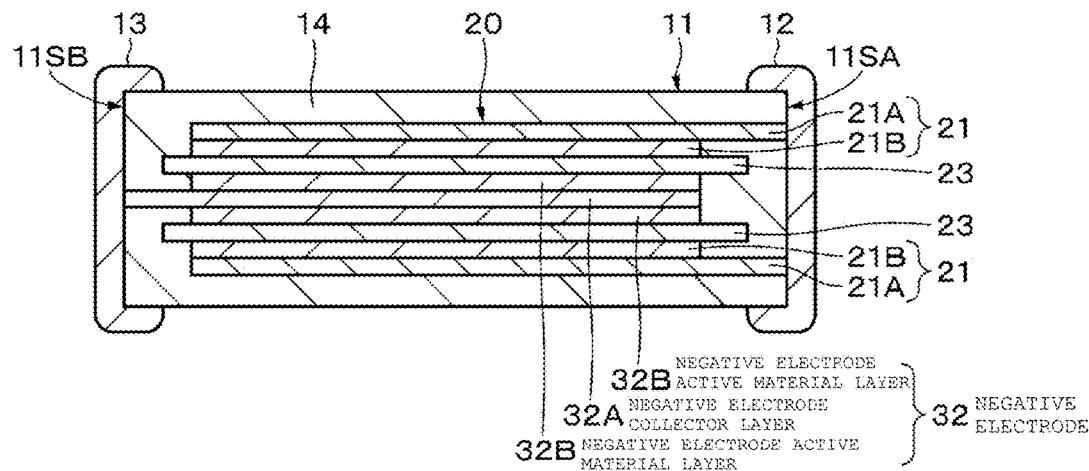
FIG. 7A is a cross-sectional view showing an example of the configuration of an all-solid-state battery according to a second embodiment of the present invention.

As shown in FIG. 7A, the battery according to the second embodiment of the present invention is different from the battery according to the first embodiment in that it includes a negative electrode layer 32 including a negative electrode collector layer 32A and a negative electrode active material layer 22B provided on each surface of the negative electrode collector layer 32A.

Figure 7B:
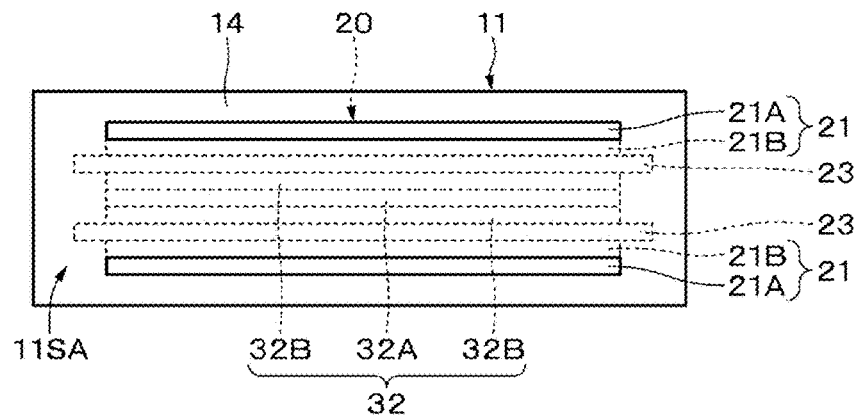
FIG. 7B is a plan view showing an example of the configuration of the first end face.
Figure 7C:
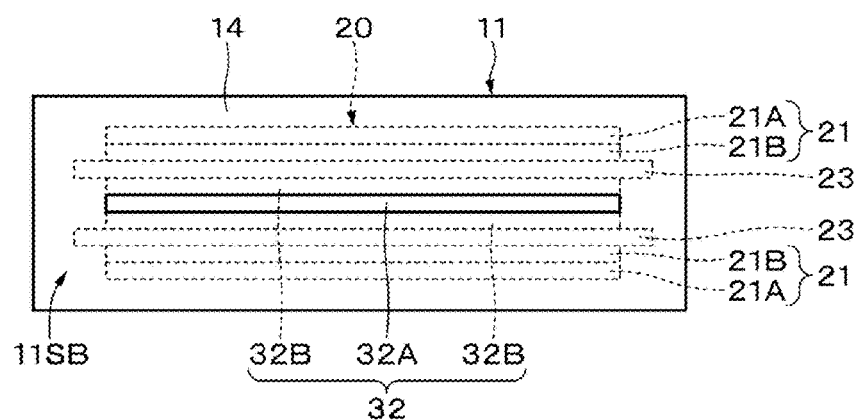
FIG. 7C is a plan view showing an example of the configuration of the second end face.

The exterior material 14 covers the surface of the battery element 20 so that the end portion of the positive electrode collector layer 21A and the end portion of the negative electrode collector layer 32A are exposed at different end faces of the exterior battery element 11. More specifically, as shown in FIG. 7B, the exterior material 14 covers the surface of the battery element 20 so that one end of the positive electrode collector layer 21A is exposed from the first end face 11SA, and, as shown in FIG. 7C, one end of the negative electrode collector layer 32A is exposed from the second end face 11SB. The one end of the positive electrode collector layer 21A exposed from the first end face 11SA is electrically connected to the positive electrode terminal 12. The one end of the negative electrode collector layer 32A exposed from the second end face 11SB is electrically connected to the negative electrode terminal 13.

(Negative Electrode Collector Layer)

The negative electrode collector layer 32A contains one or more types of conductive grains and one or more types of solid electrolytes. The negative electrode collector layer 32A is a fired body of a green sheet as a negative electrode collector layer precursor, for example.

The conductive grain is the same as that contained in the positive electrode terminal 12 and the negative electrode terminal 13 of the first embodiment. The solid electrolyte is the same as that contained in the solid electrolyte layer 23 of the first embodiment. However, the composition (type of material) or the composition ratio of the solid electrolyte contained in the solid electrolyte layer 23 and the negative electrode collector layer 32A may be the same or may be different.

The negative electrode collector layer 32A may be a metal layer containing, for example, Cu, stainless steel, or the like. The shape of the metal layer is, for example, a foil shape, a plate shape, a mesh shape, or the like.

(Negative Electrode Active Material Layer)

The negative electrode active material layer 32B contains one or more types of negative electrode active materials and one or more types of solid electrolytes. The solid electrolyte may have a function as a binder. The negative electrode layer 22 may further contain a conductive agent, if necessary. The negative electrode layer 22 is a fired body of a green sheet as a negative electrode layer precursor, for example.

From the viewpoint of obtaining a high energy density, the negative electrode active material is preferably a carbon material or a metal-based material, but is not limited thereto. The carbon material is the same as that contained in the above-described negative electrode layer 22.

The metal-based material is, for example, a material containing, as a constituent element, a metal element or a semimetal element capable of forming an alloy with lithium. More specifically, for example, the metal-based material is one or more types of a simple substance, an alloy, or a compound of Si (silicon), Sn (tin), Al (aluminum), In (indium), Mg (magnesium), B (boron), Ga (gallium), Ge (germanium), Pb (lead), Bi (bismuth), Cd (cadmium), Ag (silver), Zn (zinc), Hf (hafnium), Zr (zirconium), Y (yttrium), Pd (palladium), Pt (platinum), or the like. However, the simple substance is not limited to be 100% in purity, and it may contain trace impurities. Examples of the alloy or the compound include $SiB_4$, $TiSi_2$, SiC, $Si_3N_4$, $SiO_v$ ($0<v\leq2$), LiSiO, $SnO_w$ ($0<w\leq2$), $SnSiO_3$, LiSnO, and $Mg_2Sn$.

The metal-based material may be a lithium-containing compound or a lithium metal (a simple substance of lithium). The lithium-containing compound is a composite oxide (lithium transition metal composite oxide) containing lithium and a transition metal element as constituent elements. Examples of this composite oxide include $Li_4Ti_5O_{12}$.

The solid electrolyte is the same as that contained in the solid electrolyte layer 23 described above. However, the composition (type of material) or the composition ratio of the solid electrolyte contained in the solid electrolyte layer 23 and the negative electrode active material layer 32B may be the same or may be different.

The conductive agent is the same as the conductive agent in the above-described positive electrode active material layer 21B.

[Variation]

(Variation 1)

In the second embodiment, the example of the battery element 20 configured to include the two positive electrode layers 21, the one negative electrode layer 22, and the two solid electrolyte layers 23 was explained. However, the battery element 20 may have a configuration in which the positive electrode layer 21 and the negative electrode layer 22 are laminated via the solid electrolyte layer 23, and the numbers of layers of the positive electrode layer 21, the negative electrode layer 22, and the solid electrolyte layer 23 are not particularly limited.

Figure 8:
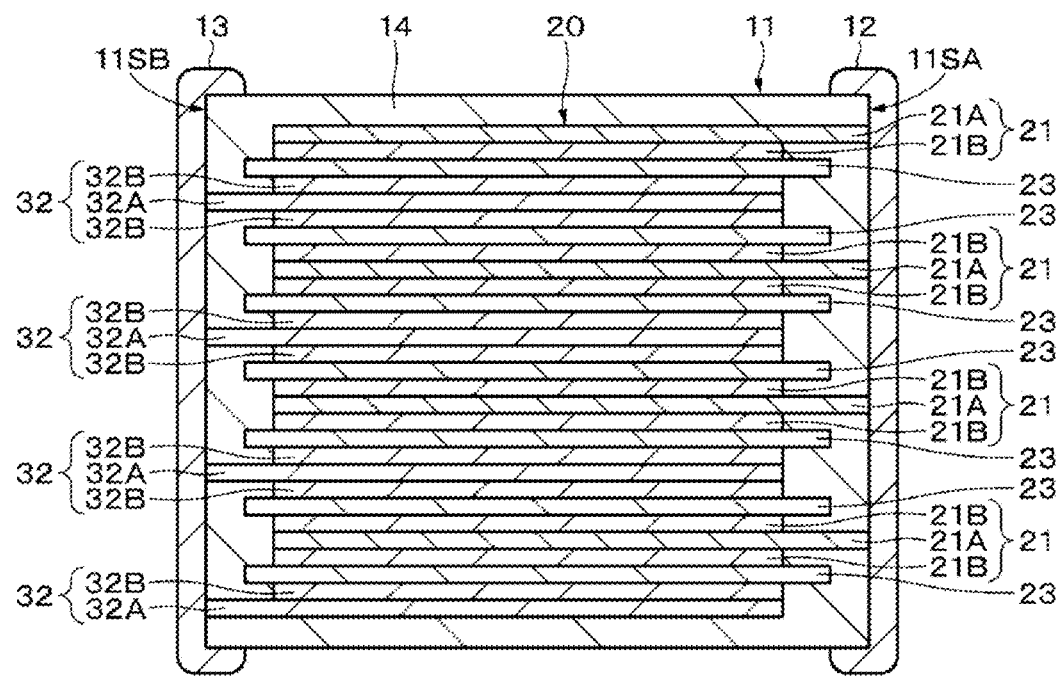
FIG. 8 is a cross-sectional view showing an example of the configuration of an all-solid-state battery according to a variation of the second embodiment of the present invention.

FIG. 8 shows an example of the configuration in which the battery element 20 includes the four positive electrode layers 21, the four negative electrode layers 32, and the seven solid electrolyte layers 23. Among the four positive electrode layers 21, the positive electrode layers 21 positioned at one end of the battery element 20 includes the positive electrode collector layer 21A and the positive electrode active material layer 21B provided on the main surface on the side opposite to the negative electrode layer 32 of the both main surfaces of the positive electrode collector layer 21A. Among the four negative electrode layers 32, the negative electrode layers 32 positioned at the other end of the battery element 20 includes the negative electrode collector layer 32A and the negative electrode active material layer 32B provided on the main surface on the side opposite to the positive electrode layer 21 of the both main surfaces of the negative electrode collector layer 32A.

The positive electrode layers 21 other than the one positioned at the one end of the battery element 20 each include the positive electrode collector layer 21A and the positive electrode active material layer 21B provided on each of the main surfaces of the positive electrode collector layer 21A. The negative electrode layers 32 other than the one positioned at the other end of the battery element 20 each include the negative electrode collector layer 32A and the negative electrode active material layer 32B provided on each of the main surfaces of the negative electrode collector layer 32A.

Figure 9A:
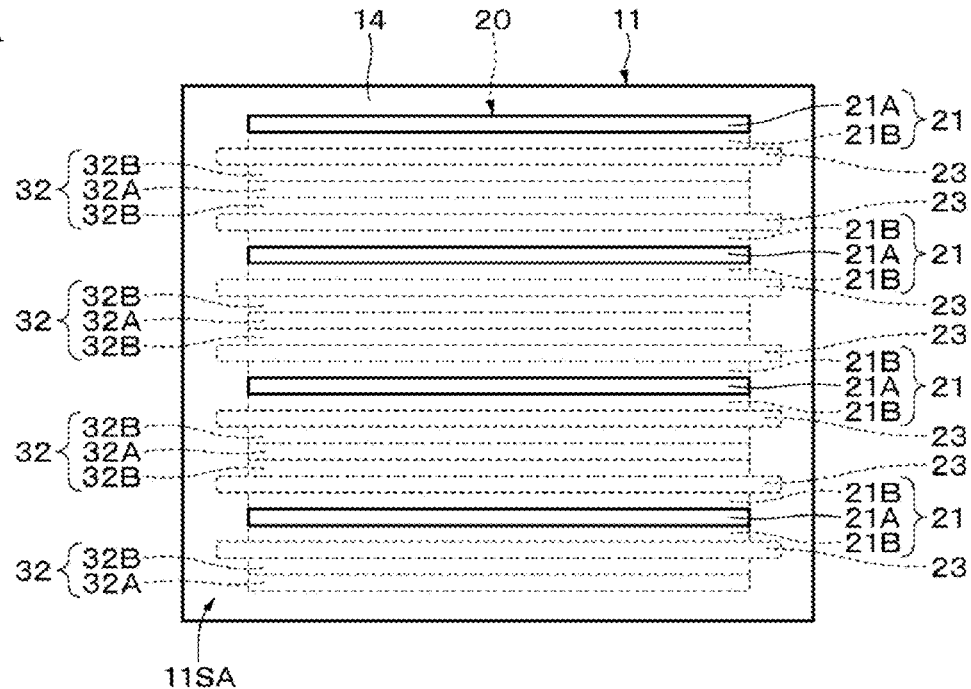
FIG. 9A is a plan view showing an example of the configuration of the first end face.
Figure 9B:
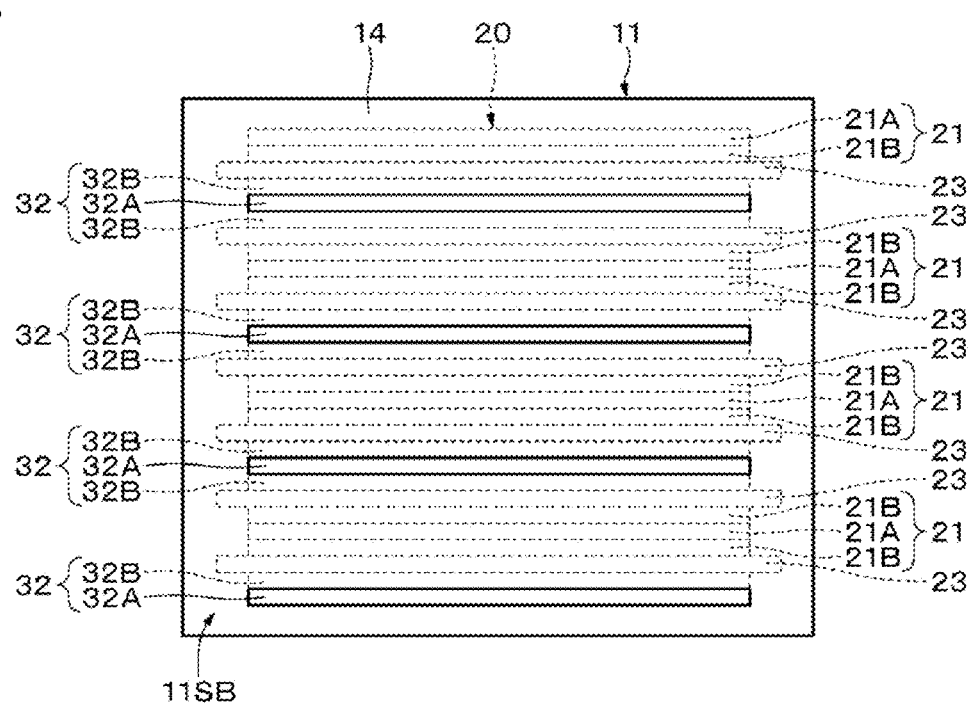
FIG. 9B is a plan view showing an example of the configuration of the second end face.

As shown in FIG. 9A, one end of the four positive electrode collector layers 21A is exposed from the first end face 11SA. The positive electrode terminal 12 is electrically connected to the exposed one end of the four positive electrode collector layers 21A. On the other hand, as shown in FIG. 9B, one end of the four negative electrode collector layers 32A is exposed from the second end face 11SB. The negative electrode terminal 13 is electrically connected to the exposed one end of the four negative electrode collector layers 32A.

EXAMPLES

Hereinafter, the present invention will be specifically described with reference to examples, but the present invention is not limited only to these examples.

Example 1

The all-solid-state battery shown in FIG. 1A and FIG. 1B was obtained in the following manner. First, a glass containing $Bi_2O_3$ as a main component and a crystal powder of $Al_2O_3$ were mixed. At this time, the mixture ratio of the glass and the crystal powder was adjusted so that the volume ratio of the glass and the crystal powder in the finally obtained exterior material was 50 vol %:50 vol %. Next, a paste for forming the exterior material was prepared by further adding and mixing a resin binder and a high boiling point solvent to the mixture.

Subsequently, the paste was printed on the surface of the laminate type battery element such that the end portion of the positive electrode collector layer was exposed from one end face and the end portion of the negative electrode layer was exposed from the other end face. After the printing, the following degreasing process was carried out. That is, the resin binder was burned by applying heat to the paste at a temperature equal to or higher than the oxidation combustion temperature of the resin binder contained in the paste. After degreasing, heat was applied to the paste at a sintering temperature equal to or higher than the softening point of the glass contained in the paste, and the glass was sintered, thereby obtaining the exterior battery element. Thereafter, an Ag paste was dipped on each of the end faces of the exterior battery element, and the exterior battery element was fired again at the curing temperature of the Ag paste. As a result, the target all-solid-state battery was obtained.

Example 2

The all-solid-state battery shown in FIG. 1A and FIG. 1B was obtained in the following manner. First, a paste for forming the exterior material was prepared in the same manner as in Example 1. Next, this paste was applied on a mold releasing film and dried, thereby forming a green sheet on a peeling film. Next, the green sheet was punched into a rectangular shape together with the mold releasing film, and then the green sheet was peeled from the mold releasing film. As a result, the green sheet of 50 μm thick as an exterior material precursor was obtained.

Subsequently, the prepared green sheet was disposed on each of the main surfaces of the laminate type battery element, and isostatic pressing was performed collectively.

After the pressing, the following degreasing process was carried out. That is, the resin binder was burned by applying heat to the green sheet at a temperature equal to or higher than the oxidation combustion temperature of the resin binder contained in the green sheet. After degreasing, heat was applied to the green sheet at a sintering temperature equal to or higher than the softening point of the glass contained in the green sheet, and the glass was sintered, thereby obtaining the exterior battery element. Thereafter, an Ag paste was dipped on each of the end faces of the exterior battery element, and the exterior battery element was fired again at the curing temperature of the Ag paste. As a result, the target all-solid-state battery was obtained.

Comparative Example 1

An all-solid-state battery was obtained in the same manner as in Example 1 except that the paste for forming the exterior material was prepared without mixing $Al_2O_3$ crystal powder.

Comparative Example 2

An all-solid-state battery was obtained in the same manner as in Example 2 except that the paste for forming the exterior material was prepared without mixing $Al_2O_3$ crystal powder.

[Appearance Evaluation]

The surface of the all-solid-state battery obtained as described above was visually observed, and it was confirmed whether or not a crack had occurred in the exterior material. As a result, a crack in the exterior material was not found in the all-solid-state batteries of Examples 1 and 2, whereas a crack in the exterior material was found in the all-solid-state batteries of Comparative Examples 1 and 2. Accordingly, the glass state material and the crystalline state material are contained in the exterior material, and it is hence possible to suppress the occurrence of a crack in the exterior material in the firing process (such as the time of cooling after firing) of the exterior material.

Reference Example 1

First, a paste for forming the exterior material was prepared in the same manner as in Example 1. Next, this paste was applied on a mold releasing film and dried, thereby forming a green sheet on a peeling film. Next, the green sheet was punched into a rectangular shape together with the mold releasing film, and then the green sheet was peeled from the mold releasing film. As a result, the green sheet as an exterior material precursor was obtained.

Subsequently, the following degreasing process was carried out. That is, the resin binder was burned by applying heat to the green sheet at a temperature equal to or higher than the oxidation combustion temperature of the resin binder contained in the green sheet. After degreasing, heat was applied to the green sheet at a sintering temperature equal to or higher than the softening point of the glass contained in the green sheet, and the glass was sintered. Thus, the exterior material having an average thickness of 176 μm was obtained.

[Evaluation of Moisture Permeability]

The moisture vapor transmission rate (23° C., 90% RH) of the exterior material (average thickness of 176 μm) of Reference Example 1 obtained as described above was measured in conformity with JIS K 7129-C (ISO 15106-4). As a result, the moisture vapor transmission rate was $1.1 \times 10^{-2}$ $g/m^2/day$.

The moisture vapor transmission rate of the exterior material having the average thickness of 176 μm was converted into the moisture vapor transmission rate of that having the average thickness of 20 μm, which was $9.6 \times 10^{-2}$ $g/m^2/day$. The moisture vapor transmission rate of the exterior material having the average thickness of 176 μm was converted into the moisture vapor transmission rate of the exterior material having the average thickness of 50 μm, which was $3.9 \times 10^{-2}$ $g/m^2/day$. This result indicates that the moisture vapor transmission rate can be suppressed sufficiently low even when the average thickness of the exterior material is 50 μm or less.

3 Application Examples

"Printed Circuit Board as Application Example"

Figure 10:
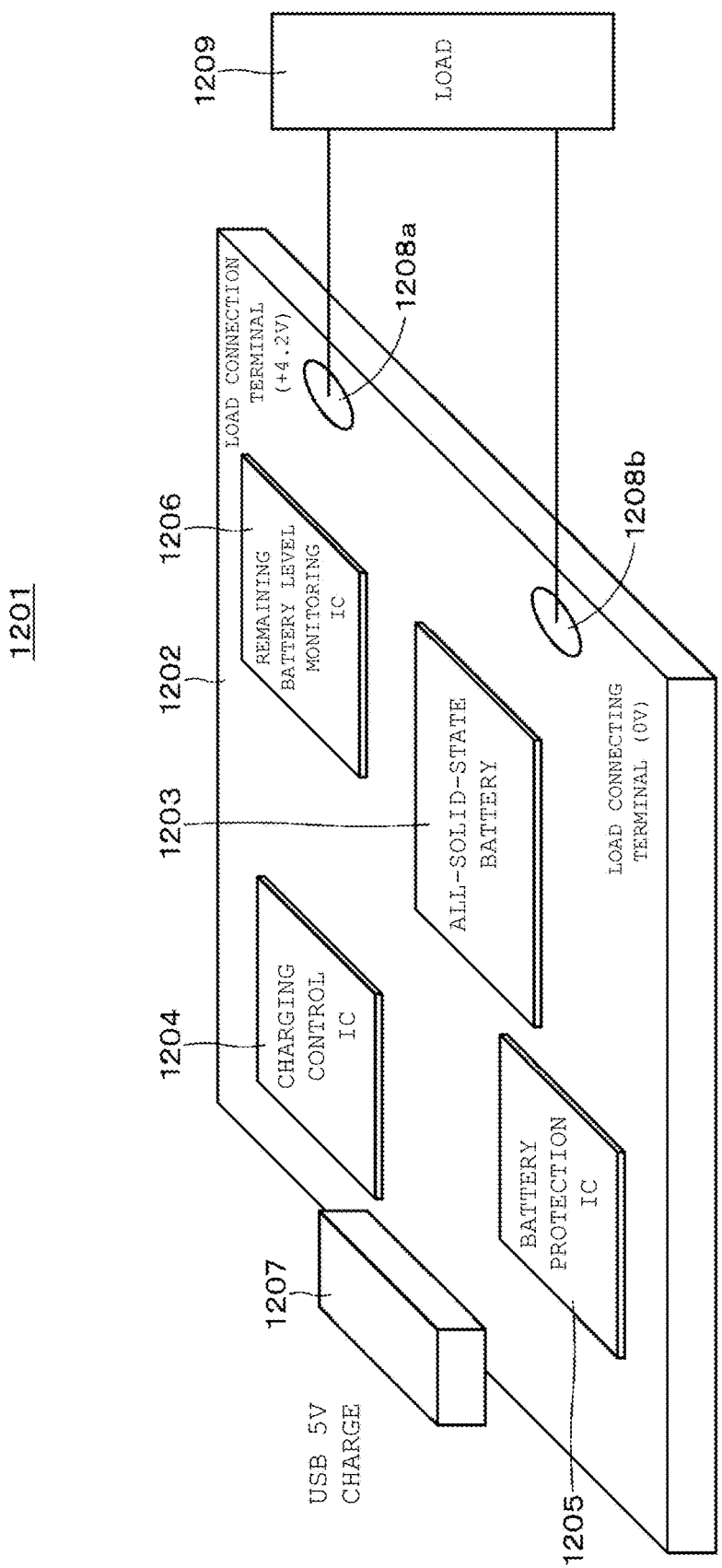
FIG. 10 is a perspective view showing an example of a printed circuit board as an application example of the present invention.

Hereinafter, an application example in which the present invention is applied to a printed circuit board will be described. As shown in FIG. 10, the all-solid-state battery described above can be mounted on a printed circuit board 1202 together with a charging circuit and the like. For example, an all-solid-state battery 1203 and an electronic circuit such as a charging circuit can be mounted on the printed circuit board 1202 by a reflow process. The printed circuit board 1202 on which the all-solid-state battery 1203 and the electronic circuit such as a charging circuit are mounted is referred to as a battery module 1201. The battery module 1201 is configured as a card shape where necessary, and can be configured as a portable card type mobile battery.

The all-solid-state battery 1203 is formed on the printed circuit board 1202. A charge control integrated circuit (IC) 1204, a battery protection IC 1205, and a remaining battery level monitoring IC 1206 are formed as they share the printed circuit board 1202. The battery protection IC 1205 controls the charge and discharge operation so as to prevent a charging voltage from becoming excessive at the time of charge and discharge, an overcurrent from flowing due to a load short circuit, and an overdischarge from occurring.

A universal serial bus (USB) interface 1207 is attached to the printed circuit board 1202. The all-solid-state battery 1203 is charged by electric power supplied through the USB interface 1207. In this case, the charging operation is controlled by the charge control IC 1204. Further, a predetermined electric power (for example, voltage is 4.2V) is supplied to a load 1209 from load connection terminals 1208a and 1208b attached to the printed circuit board 1202. The remaining battery level of the all-solid-state battery 1203 is monitored by the remaining battery level monitoring IC 1206 so that a display (not illustrated) indicative of the battery remaining level can be recognized from the outside. The USB interface 1207 may be used for load connection.

Specific examples of the above-described load 1209 are as follows.

1. Wearable devices (sports watches, watches, hearing aids, and the like)
2. IoT terminals (sensor network terminals and the like)
3. Amusement devices (handheld game console terminals and game controllers)
4. IC board embedded batteries (real-time clock IC)
5. Environmental power generation devices (power storage elements for power generation elements such as photovoltaic power generation, thermoelectric power generation, and vibration power generation)

"Universal Credit Card as Application Example"

Hereinafter, an application example in which the present invention is applied to a universal credit card will be described.

Currently, many people carry a plurality of credit cards. There is a problem that the more credit cards they have, the higher the risk of loss, theft, and the like become. Therefore, a card called a universal credit card in which functions of a plurality of credit cards, loyalty cards, and the like are integrated in a single card has been put into practical use. Information of, for example, card numbers and expiration dates of various credit cards and loyalty cards and the like can be integrated in this card. Thus, if such a single card is put into a wallet or the like, the users can select and use whatever cards they like anytime.

Figure 11:
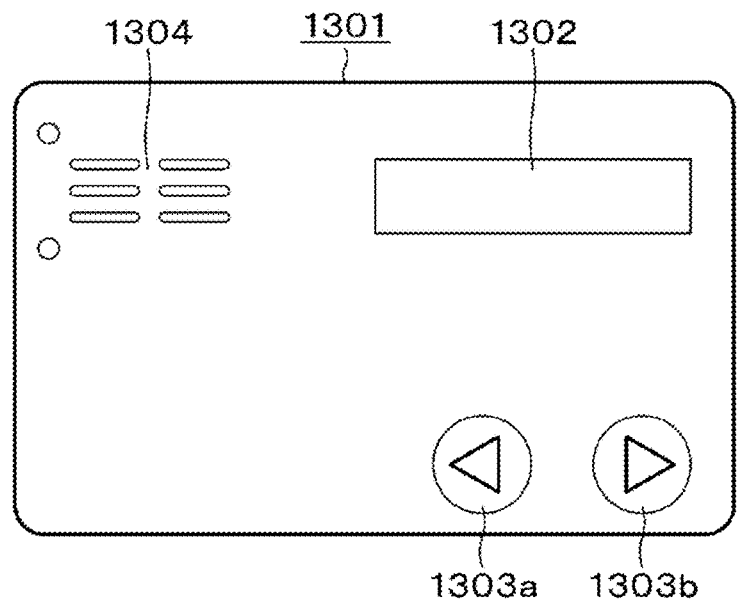
FIG. 11 is a plan view showing an appearance of a universal credit card as an application example of the present invention.

FIG. 11 shows an example of the configuration of a universal credit card 1301. It is shaped into a card and has a built-in IC chip and a built-in all-solid-state battery according to the present invention. In addition, it is provided with a display 1302 with low power consumption and operating portions such as arrow keys 1303a and 1303b. Further, a charging terminal 1304 is provided on the surface of the universal credit card 1301.

The user can specify a credit card or the like loaded in advance in the universal credit card 1301 by operating the arrow keys 1303a and 1303b while viewing the display 1302, for example. If a plurality of credit cards are loaded in advance, information indicative of each credit card is displayed on the display 1302, and the user can designate a desired credit card by operating the arrow keys 1303a and 1303b. After that, it can be used similar to a conventional credit card. It is to be noted that the above is just an example and that the all-solid-state battery according to the present invention can obviously be applied to any electronic card other than the universal credit card 1301.

"Sensor Network Terminal as Application Example"

Hereinafter, an application example in which the present invention is applied to a sensor network terminal will be described.

A wireless terminal in a wireless sensor network is called a sensor node, and is composed of one or more wireless chips, a microprocessor, a power supply (battery), and the like. Specific examples of use of the sensor network include monitoring of energy saving management, healthcare, industrial measurement, traffic situation, agriculture, and the like. Voltage, temperature, gas, illuminance, and the like are used as the type of the sensor.

In a case of energy saving management, a power monitor node, a temperature/humidity node, an illuminance node, a $CO_2$ node, a human motion node, a remote control node, a router (repeater), and the like are used as a sensor node. These sensor nodes are provided so as to constitute a wireless network in homes, office buildings, factories, shops, amusement facilities, and the like.

Data such as temperature, humidity, illuminance, $CO_2$ concentration, electric energy, and the like are displayed, and the situation of energy saving of the environment is made visible. Furthermore, on/off control of lighting, air conditioning facility, ventilation facility, and the like are performed by a command from the control station.

ZigBee (registered trademark) can be used as one of the wireless interfaces of the sensor network. This wireless interface is one of the short-distance wireless communication standards, and has a feature of inexpensiveness and small power consumption in exchange for a short transferable distance and a low transfer speed. Accordingly, it is suitable to be mounted in a battery-powered device. The basic part of this communication standard is standardized as IEEE 802.15.4. ZigBee (registered trademark) Alliance develops specifications for communication protocols between devices of the logical layer and higher.

Figure 12:
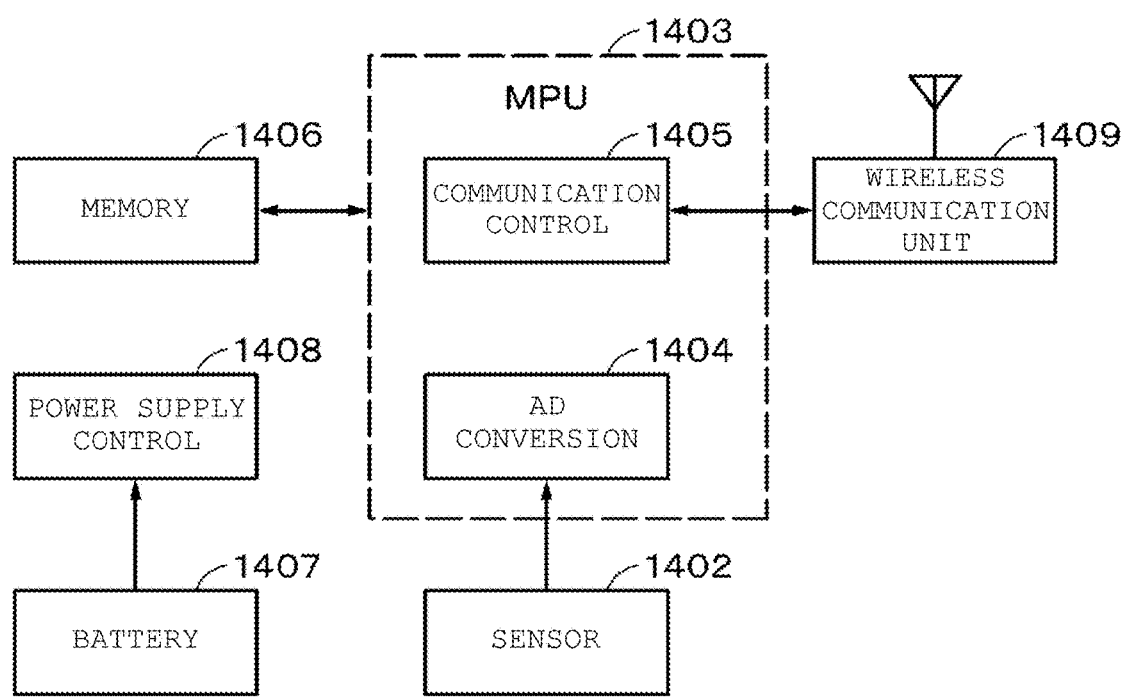
FIG. 12 is a block diagram of an example of a wireless sensor node as an application example of the present invention.

FIG. 12 shows the configuration of an example of a wireless sensor node 1401. A detection signal of a sensor 1402 is supplied to an AD conversion circuit 1404 of a microprocessor (MPU) 1403. The various sensors described above can be used as the sensor 1402. A memory 1406 is provided in association with the microprocessor 1403. Further, output of a battery 1407 is supplied to a power supply control unit 1408, and the power supply of the wireless sensor node 1401 is managed. The above-mentioned allsolid-state battery, a card type battery pack, or the like can be used as the battery 1407. The charge and discharge device according to the present invention is applied when using an all-solid-state battery.

A program is installed in the microprocessor 1403. The microprocessor 1403 processes data of detection results of the sensor 1402 output from the AD conversion circuit 1404 according to the program. A wireless communication unit 1409 is connected to a communication control unit 1405 of the microprocessor 1403. Detection result data are transmitted from the wireless communication unit 1409 to a network terminal (not illustrated), e.g., using ZigBee (registered trademark) and the microprocessor 1403 is connected to the network via the network terminal. A predetermined number of wireless sensor nodes can be connected to one network terminal. Available network topology includes the tree, the mesh, and the linear, in addition to the star.

"Wristband Type Electronic Device as Application Example"

Hereinafter, an application example in which the present invention is applied to a wristband type electronic device will be described.

An example of wearable terminals is wristband type electronic devices. Among them, the wristband type activity meter, which is also called the smart band, is capable of acquiring data on human activities such as the number of steps, travel distance, calorie consumption, amount of sleep, and heart rate, when simply wrapped around the arm. Further, the acquired data can be managed by the smartphone. Further, it is also possible to include a mail transmission/reception function. For example, those with a notification function of notifying the user of an incoming mail by a light emitting diode (LED) lamp and/or vibrating is used.

Figure 13:
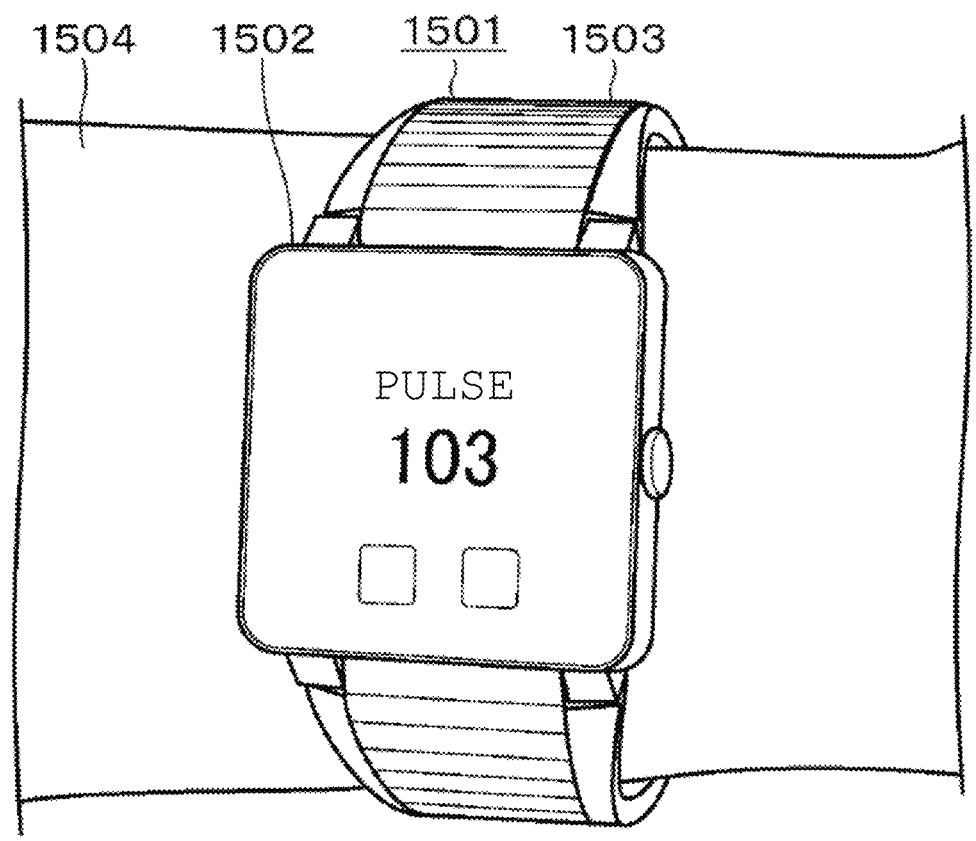
FIG. 13 is a perspective view showing an appearance of an example of a wristband type activity meter as an application example of the present invention.
Figure 14:
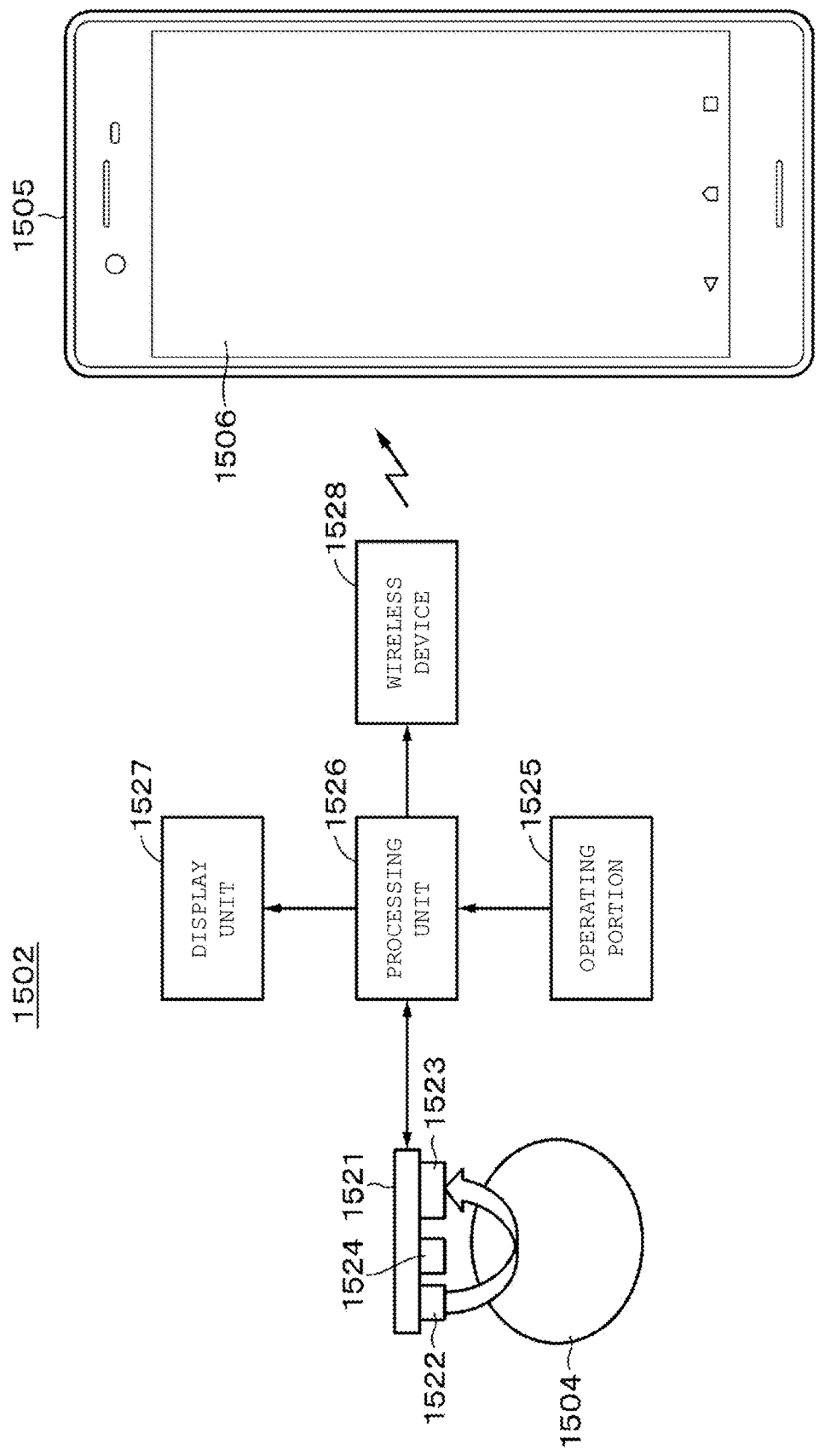
FIG. 14 is a block diagram showing a configuration of a main part of a wristband type activity meter.

FIG. 13 and FIG. 14 show an example of wristband type activity meters for measuring a pulse, for example. FIG. 13 shows a configuration example of the appearance of a wristband type activity meter 1501. FIG. 14 shows a configuration example of a main body portion 1502 of the wristband type activity meter 1501.

The wristband type activity meter 1501 is a wristband type measurement device for measuring, for example, the pulse of a test subject in an optical manner. As shown in FIG. 13, the wristband type activity meter 1501 is composed of the main body portion 1502 and a band 1503 and, similarly to a watch, the band 1503 is worn on an arm (wrist) 1504 of a test subject. Then, the main body portion 1502 irradiates a site of the arm 1504 of the test subject including the pulse with measurement light having a predetermined wavelength, and, based on the intensity of the returning light, measures the pulse of the test subject.

The main body portion 1502 is configured to include a board 1521, an LED 1522, a light-receiving integrated circuit (IC) 1523, a light-shielding body 1524, an operating portion 1525, a processing unit 1526, a display unit 1527, and a wireless device 1528. The LED 1522, the light-receiving IC 1523, and the light-shielding body 1524 are provided on the board 1521. Under the control of the light-receiving IC 1523, the LED 1522 irradiates the site of the arm 1504 of the test subject including the pulse with measurement light having a predetermined wavelength.

The light-receiving IC 1523 receives the light returning after the measurement light is irradiated onto the arm 1504. The light-receiving IC 1523 generates a digital measurement signal indicative of the intensity of returned light and supplies the generated measurement signal to the processing unit 1526.

The light-shielding body 1524 is provided between the LED 1522 and the light-receiving IC 1523 on the board 1521. The light-shielding body 1524 prevents measurement light from the LED 1522 from directly entering the light-receiving IC 1523.

The operating portion 1525 is composed of various operation members such as buttons and switches for example, and is provided on the surface of the main body portion 1502 or the like. The operating portion 1525 is used for operating the wristband type activity meter 1501 and supplies a signal indicative of the operation content to the processing unit 1526.

The processing unit 1526 performs arithmetic processing for measuring the pulse of the test subject based on the measurement signal supplied from the light-receiving IC 1523. The processing unit 1526 supplies the measurement result of the pulse to the display unit 1527 and the wireless device 1528.

The display unit 1527 is constituted by a display device such as a liquid crystal display (LCD) for example, and is provided on the surface of the main body portion 1502. The display unit 1527 displays the measurement result of the pulse of the test subject and the like.

The wireless device 1528 transmits the measurement result of the pulse of the test subject to an external device by wireless communication of a predetermined method. For example, as shown in FIG. 14, the wireless device 1528 transmits the measurement result of the pulse of the test subject to a smartphone 1505, and displays the measurement result on a screen 1506 of the smartphone 1505. Further, data of the measurement result are managed by the smartphone 1505, and the measurement result can be viewed using the smartphone 1505 and can be stored in a server on the network. An arbitrary method can be adopted as the communication method of the wireless device 1528. Note that the light-receiving IC 1523 can also be used to measure the pulse at a site (e.g., a finger, an earlobe, or the like) other than the arm 1504 of the test subject.

The above-described wristband type activity meter 1501 is capable of accurately measuring the pulse wave and the pulse of the test subject by removing the influence of body movement by signal processing in the light-receiving IC 1523. For example, even if the test subject works out vigorously such as running, it is possible to accurately measure the pulse wave and the pulse of the test subject. For example, even when the measurement is performed with the wristband type activity meter 1501 being worn on the test subject for a long time, it is possible to keep accurately measuring the pulse wave and the pulse by removing the influence of the body motion of the test subject.

Further, reduction in the amount of calculation allows the power consumption of the wristband type activity meter 1501 to be reduced. As a result, it becomes possible to perform the measurement with the wristband type activity meter 1501 being worn on the test subject for a long time without charging or replacing the battery, for example.

As a power supply, for example, a thin battery is housed in the band 1503. The wristband type activity meter 1501 includes an electronic circuit of the main body and a battery pack. For example, the battery pack is configured to be detachable and attachable by the user. The electronic circuit is a circuit included in the above-described main body portion 1502.

Figure 15:
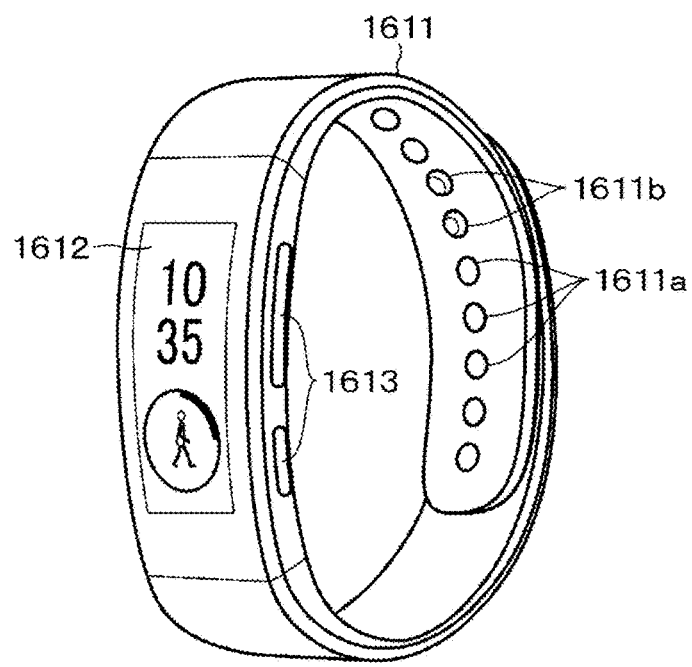
FIG. 15 is a perspective view showing an appearance of an example of a wristband type electronic device as an application example of the present invention.
Figure 16:
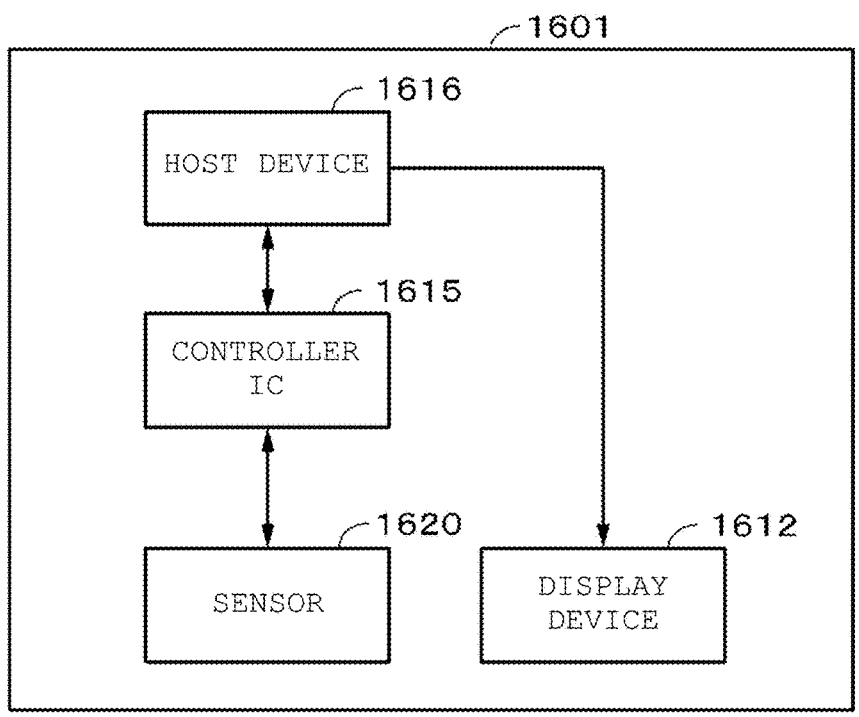
FIG. 16 is a block diagram showing a configuration of an example of a wristband type electronic device.

FIG. 15 and FIG. 16 show another example of a wristband type electronic device. FIG. 15 shows a configuration example of the appearance of a wristband type electronic device 1601. FIG. 16 shows a configuration block diagram of the wristband type electronic device 1601 (hereinafter simply referred to as the "electronic device 1601").

The electronic device 1601 is, for example, a so-called wearable device that is a watch type detachable from and attachable to the human body. The electronic device 1601 includes, for example, a band portion 1611 to be worn on the arm, a display device 1612 that displays numerals, characters, symbols, and the like, and operation buttons 1613. The band portion 1611 is provided with a plurality of hole portions 1611a and protrusions 1611b formed on the inner peripheral surface (the surface in contact with the arm when the electronic device 1601 is worn) side.

When in use, the electronic device 1601 is bent so that the band portion 1611 becomes substantially circular as shown in FIG. 15, the protrusions 1611b are inserted into the hole portions 1611a, and thus the electronic device 1601 is worn on the arm. By adjusting the position of the hole portions 1611a into which the protrusions 1611b are inserted, the size of the diameter can be adjusted corresponding to the arm thickness. When the electronic device 1601 is not in use, the protrusions 1611b are removed from the hole portions 1611a, and the band portion 1611 is stored in a substantially flat state. The sensor according to an embodiment of the present invention is provided over the entire band portion 1611, for example.

FIG. 16 is a block diagram showing a configuration example of the electronic device 1601. As shown in FIG. 16, the electronic device 1601 includes a sensor 1620 including a controller IC 1615 as a drive control unit and a host device 1616, in addition to the above-described display device 1612. The sensor 1620 may include the controller IC 1615.

The sensor 1620 is capable of detecting both pressing and bending. The sensor 1620 detects a change in electrostatic capacitance in response to pressing and outputs to the controller IC 1615 an output signal corresponding to the change. Further, the sensor 1620 detects a change (resistance change) in the resistance value in response to bending and outputs to the controller IC 1615 an output signal corresponding to the change.

The host device 1616 executes various processing based on information supplied from the controller IC 1615. For example, it executes processing such as display of character information, image information, and the like on the display device 1612, movement of a cursor displayed on the display device 1612, and scrolling of the screen.

The display device 1612 is, for example, a flexible display device that displays an image (screen) based on a video signal, a control signal, and the like supplied from the host device 1616. Examples of the display device 1612 include a liquid crystal display, an electro luminescence (EL) display, and an electronic paper, but it is not limited thereto.

As a power supply, for example, a thin battery and the electronic circuit shown in FIG. 16 are housed in the band portion 1611. The electronic device 1601 includes an electronic circuit of the main body and a battery pack. For example, the battery pack is configured to be detachable and attachable by the user.

"Smartwatch as Application Example"

Hereinafter, an application example in which the present invention is applied to a smartwatch will be described.

This smartwatch has an appearance same as or similar to the design of the existing watches and is worn on the user's arm similarly to the watch when used. The smartwatch has a function of notifying the user of various messages such as an incoming call and e-mail, which is information to be displayed on the display. Moreover, smartwatches having an electronic money function and functions such as activity meter have been proposed. In the smartwatch, the display is incorporated on the surface of the main body portion of the electronic device, and various information is displayed on the display. Further, the smartwatch is capable of cooperating with functions, contents, and the like of the communication terminal or the like by performing short-distance wireless communication such as a communication terminal (a smartphone or the like) and Bluetooth (registered trademark), for example.

One of the smartwatches that have been proposed has a plurality of segments coupled in a band shape, a plurality of electronic components arranged in the plurality of segments, and a flexible circuit board that connects the plurality of electronic components in the plurality of segments and is arranged in a meandering shape in at least one segment. Such a meandering shape prevents stress from being applied to the flexible circuit board even if the band is bent, and the flexible circuit board from being cut. Further, electronic circuit parts can be built in the band side segments attached to the watch main body, not to the chassis constituting the watch main body. It is not necessary to change the watch main body side and it is possible to configure a smartwatch having the same design as the design of the conventional watch.

Next, the configuration of the smartwatch will be described in more detail. The portion corresponding to the band of a common watch serves as the main body of the smartwatch in this application example. That is, the band (belt) alone works as an electronic device. In other words, the conventional watch can be used as it is as the watch main body displaying the time with hands or the like. A band type electronic device attached to the watch main body has a communication function and a notification function that are built therein. The smartwatch of this application example is capable of performing notification such as e-mails and incoming calls, record of logs of user's action history, call, and the like. In addition, the smartwatch includes a function as a contactless IC card, and is capable of performing settlement, authentication, and the like in a contactless manner.

The smartwatch of this application example has circuit components for performing communication processing and notification processing built in a metallic band. In order to function as an electronic device while reducing the thickness of the metallic band, the band has a structure in which the plurality of segments are coupled, and a circuit board, a vibration motor, a battery, and an acceleration sensor are housed in each of the segments. The components such as the circuit board, the vibration motor, the battery, and the acceleration sensor of each of the segments are connected via a flexible printed circuit board (hereinafter referred to as an "FPC"). However, there is a problem that if the band having the built-in FPC to which each component is connected is bent in a circular shape, stress is applied to the wiring of the FPC, and the wiring of the FPC breaks. While this can be solved by providing a meandering shape as described later, another problem arises that the waterproof property of the inside of the band fails to be ensured. There is yet another problem that if the antenna is arranged in the metallic band, radio waves do not go out of the band. Furthermore, since it is normally impossible to arrange the FPC in the buckle mechanism for fastening the band, it is difficult to make an electrical connection in front of and behind the portion of the buckle mechanism.

That is, in order to incorporate an electronic device in a metallic band, it is necessary to solve the following three problems.

a. Problem of FPC wiring and waterproof
b. Problem of antenna with metal chassis
c. Problem of buckle mechanism and electrical contact The outline of the configuration for solving these three problems will be described below.

a. Configuration to Solve the Problem of FPC Wiring and Waterproof

When arranging the components of the electronic device in each of the segments, it is necessary to connect between the segments with the FPC. However, when the metallic band is bent so as to be attached to the user's arm, stress is applied to the outside of the FPC, which may cause the FPC to break. Therefore, the meandering shape is provided to prevent the FPC from breaking. In addition, since the electronic device of this application example is a smartwatch to be attached to a watch, it is necessary to provide a meandering shape while realizing waterproofing. Therefore, in this application example, a small segment called "mating component", which is a component unique to a watch band, is prepared between the segments.

In a space of the small segment, the FPC has a meandering shape. The meandering shape may have any shape such as an S shape, a V shape, a U shape, a Z shape, a curved shape, a semicircular shape, and a polygonal line shape. By doing so, even if the metallic band is bent, the meandering shape of the FPC is simply extended and the FPC does not break. Furthermore, an entrance of the FPC present in the segment portion is held with a rubber packing (relatively soft resin). Then, the mating portion maintains the waterproof property of each of the segments meanwhile letting the FPC move freely without holding the entrance. The introduction of this "mating portion" can prevent the FPC from breaking meanwhile ensuring the waterproof property of the main body. This "mating portion" can be omitted in the case where the electronic component is completed with merely one component (segment).

b. Problem of Antenna with Metal Chassis

The metal band has a problem that when an antenna is put inside, radio waves from the antenna do not go out. In the present invention, an antenna for Bluetooth (registered trademark) and an antenna for near field communication (NFC) are arranged in a single chassis (component) of a metallic band. In order to prevent the antenna characteristics from being affected by other components, an insulator is sandwiched between the components containing the antenna and other adjacent components.

The whole surface (approximately six surfaces) of the component having the antenna incorporated therein is used as the antenna. However, the antenna characteristics are deteriorated when the component comes in contact with the user's skin, and hence the surface in contact with the user's skin may be made of a material other than metal and not used as the antenna. Further, as another example, an insulation layer may be sandwiched between the metal component to be in contact with the user's skin and a component serving as an antenna. Further, the component with the built-in antenna may be used as a slit antenna by providing it with a slit. The component in which the antenna for Bluetooth (registered trademark) is arranged and the component in which the antenna for NFC may be different components. Bluetooth (registered trademark) wireless communication performs communication in the 2.4 GHz band. This allows pairing up to approximately 10 m on average when performing wireless communication in a state without obstacle between the smartwatch and the smartphone. The antenna problem can be solved by introducing a method by which the metal chassis itself is used as an antenna.

c. Problem of Buckle Mechanism and Electrical Contact

In the smartwatch of a metallic band, since the board is arranged on the largest component arranged in a position overlapping with the buckle, the buckle becomes thicker than the buckle for the ordinary watch. It is difficult to cause the FPC to pass through inside the buckle. Accordingly, there is a problem that electrical connection cannot be established between one segment and the other segment connected by the buckle.

In this application example, a thinner configuration is realized in which one of the two components constituting the buckle is housed in an empty space of the other component when the buckle is folded. In addition, it is a configuration in which an electrical contact is arranged between one segment and the other segment connected by the buckle.

(Overall Configuration of Smartwatch)

Figure 17:
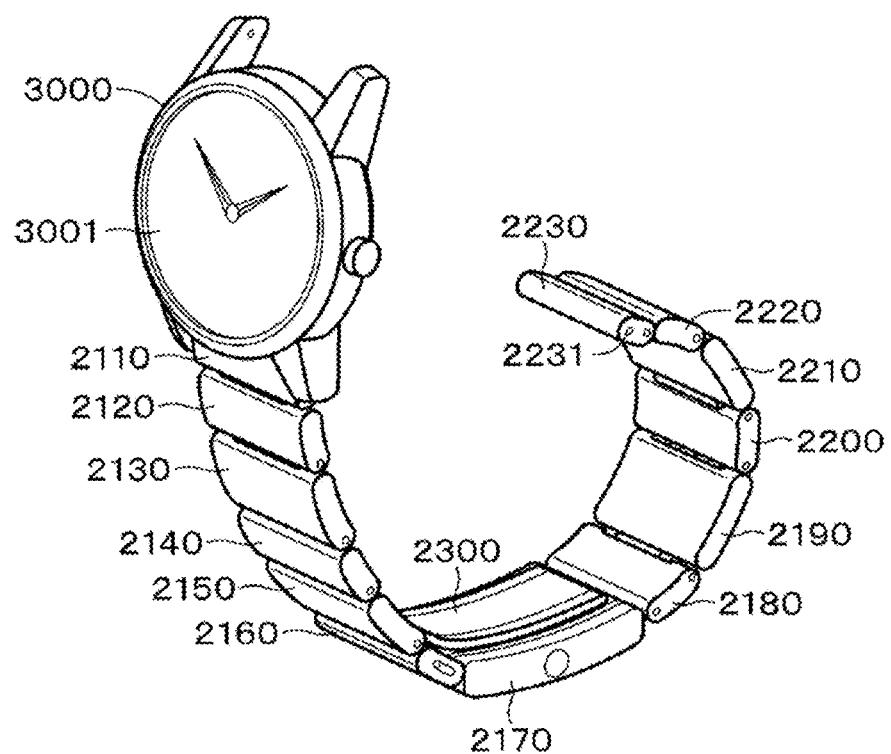
FIG. 17 is a perspective view showing an overall configuration of a smartwatch as an application example of the present invention.

FIG. 17 shows the overall configuration of the smartwatch. A band type electronic device 2000 is a metallic band to be attached to a watch main body 3000, and is worn on the user's arm. The watch main body 3000 includes a dial face 3100 displaying the time. Instead of the dial face 3100, the watch main body 3000 may electronically display the time on a liquid crystal display or the like.

The band type electronic device 2000 has a configuration in which a plurality of segments 2110 to 2230 are coupled. The segment 2110 is attached to one band attachment hole of the watch main body 3000 and the segment 2230 is attached to the other band attachment hole of the watch main body 3000. In this application example, each of the segments 2110 to 2230 is made of metal.

Figure 18:
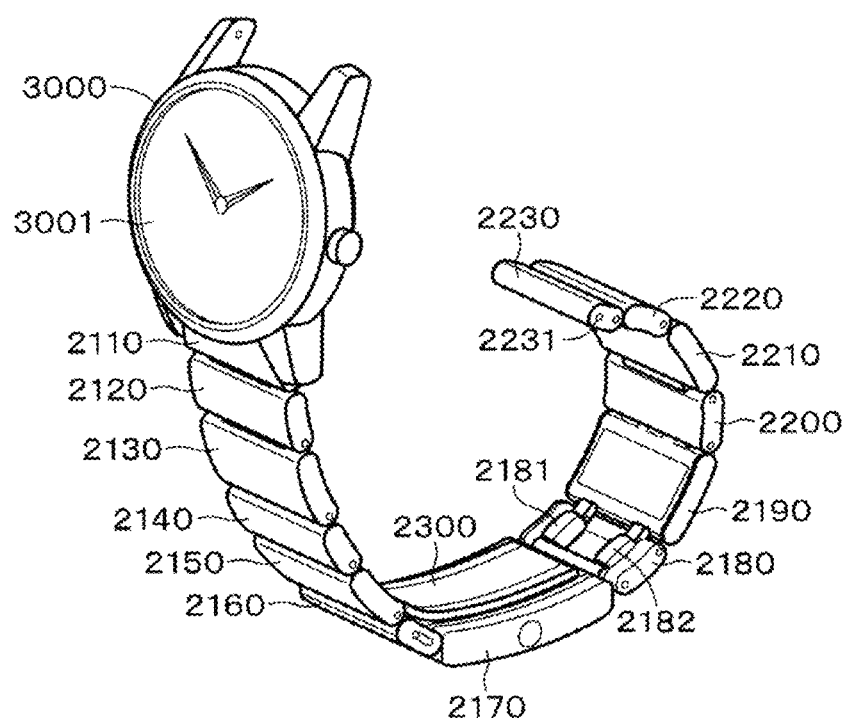
FIG. 18 is a perspective view showing an overall configuration of a smartwatch.

In order to explain the configuration of the band type electronic device 2000, FIG. 17 and FIG. 18 show the state in which the watch main body 3000 and the segment 2230 are separated. However, the segment 2230 is attached to the watch main body 3000 when in actual use. By attaching the segment 2230 to the watch main body 3000, the band type electronic device 2000 can be worn on the user's arm similarly to a normal watch. The connection portion of each of the segments 2110 to 2230 is movable. Since the connection portion of the segment is movable, the band type electronic device 2000 can be fitted to the user's arm.

A buckle portion 2300 is arranged between the segment 2170 and the segment 2160. The buckle portion 2300 elongates when unlocked and shortens when locked. The segments 2110 to 2230 are configured in a plurality of types of size. For example, the segment 2170 connected with the buckle portion 2300 has the largest size.

(Outline of the Inside of the Segment)

Figure 19:
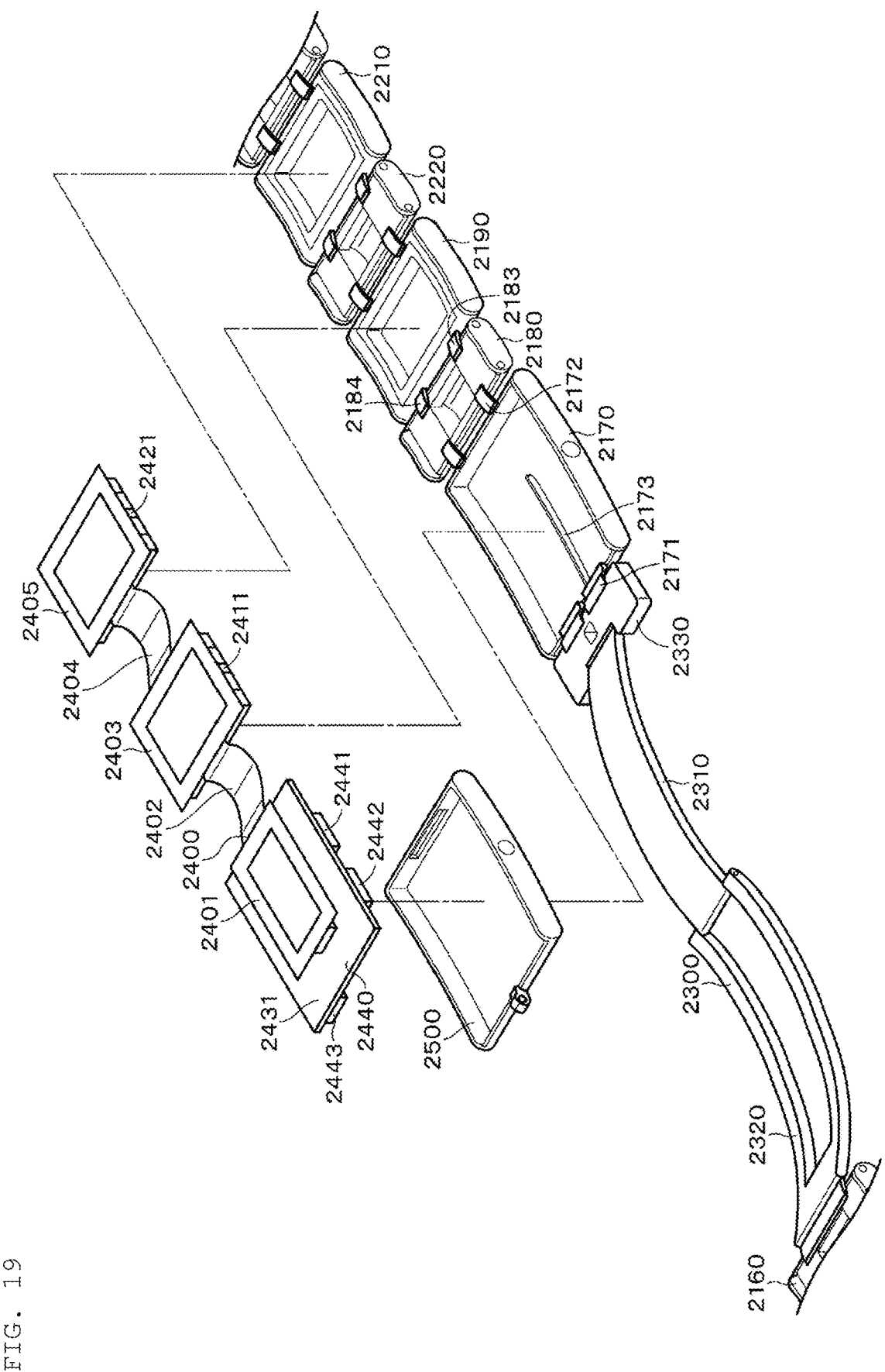
FIG. 19 is a perspective view showing a part of an internal configuration of a band type electronic device as an application example of the present invention.

FIG. 19 shows a part of the internal configuration of the band type electronic device 2000. For example, the inside of the three segments 2170, 2180, 2190, 2200, and 2210 are shown. In the band type electronic device 2000, a flexible circuit board 2400 is arranged inside the five consecutive segments 2170 to 2210. Various electronic components are arranged in the segment 2170, and batteries 2411 and 2421 are arranged in the segments 2190 and 2210, respectively. These components are electrically connected via the flexible circuit board 2400. The segment 2180 between the segment 2170 and the segment 2190 has a relatively small size and the meandering flexible circuit board 2400 is arranged therein. Inside the segment 2180, the flexible circuit board 2400 is arranged in a state of being sandwiched between waterproof members. The inside of the segments 2170 to 2210 has a waterproof structure. The waterproof structure of the segments 2170 to 2210 will be described later.

(Circuit Configuration of Smartwatch)

Figure 20:
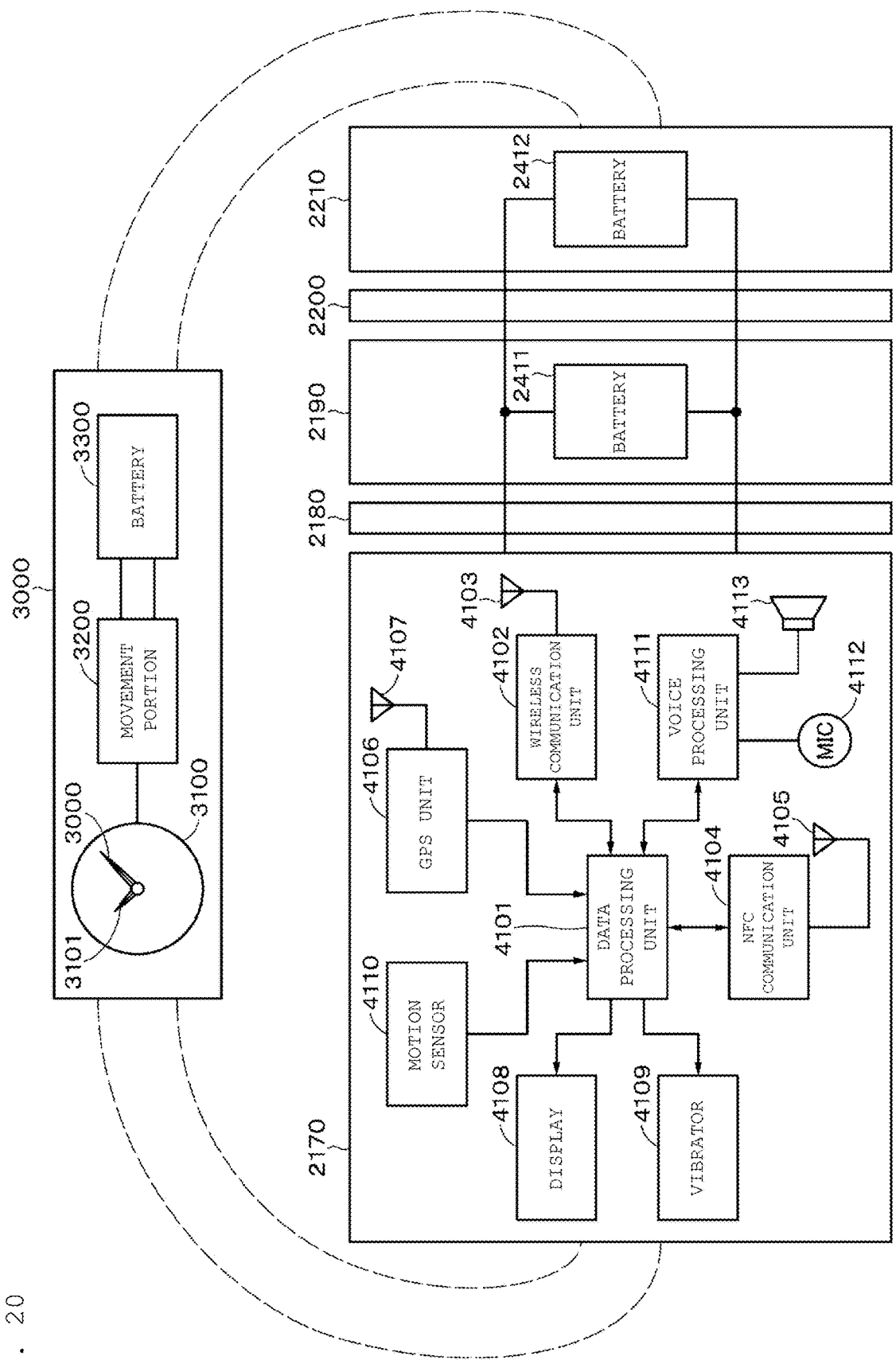
FIG. 20 is a block diagram showing a circuit configuration of a band type electronic device.

FIG. 20 is a block diagram showing a circuit configuration of the band type electronic device 2000. The circuit inside the band type electronic device 2000 has a configuration independent of the watch main body 3000. The watch main body 3000 includes a movement portion 3200 that rotates the hands arranged on the dial face 3100. A battery 3300 is connected to the movement portion 3200. The movement portion 3200 and the battery 3300 are built in the chassis of the watch main body 3000.

The band type electronic device 2000 connected to the watch main body 3000 includes electronic components that are arranged in the three segments 2170, 2190, and 2210. In the segment 2170, a data processing unit 4101, a wireless communication unit 4102, an NFC communication unit 4104, and a GPS unit 4106 are arranged. Antennas 4103, 4105, and 4107 are connected to the wireless communication unit 4102, the NFC communication unit 4104, and the GPS unit 4106, respectively. The respective antennas 4103, 4105, and 4107 are arranged in the vicinity of a slit 2173 of the segment 2170 described later.

The wireless communication unit 4102 performs short-distance wireless communication with other terminals according to the Bluetooth (registered trademark) standard, for example. The NFC communication unit 4104 performs wireless communication with a close reader/writer according to the NFC standard. The GPS unit 4106 is a positioning unit that receives a radio wave from a satellite of a system called global positioning system (GPS) to perform positioning of the current position. Data acquired by the wireless communication unit 4102, the NFC communication unit 4104, and the GPS unit 4106 are supplied to the data processing unit 4101.

In the segment 2170, a display 4108, a vibrator 4109, a motion sensor 4110, and a voice processing unit 4111 are arranged. The display 4108 and the vibrator 4109 function as a notification unit that gives notifications to the wearer of the band type electronic device 2000. The display 4108, which includes a plurality of light-emitting diodes, gives notifications to the user by turning on or blinking the light-emitting diodes. The plurality of light-emitting diodes are arranged inside the slit 2173 described later of the segment 2170 for example, and gives notifications of an incoming telephone call, e-mail reception, or the like by turning on or blinking. A type of display that displays characters, numbers, and the like may be used as the display 4108. The vibrator 4109 is a member that vibrates the segment 2170. The band type electronic device 2000 gives notifications of an incoming call, e-mail reception, and the like by the vibrator 4109 vibrating the segment 2170.

The motion sensor 4110 detects the movement of the user wearing the band type electronic device 2000. As the motion sensor 4110, an acceleration sensor, a gyro sensor, an electronic compass, an atmospheric pressure sensor, or the like is used. The segment 2170 may have a built-in sensor other than the motion sensor 4110. For example, it may have a built-in biosensor that detects the pulse or the like of the user wearing the band type electronic device 2000. A microphone 4112 and a speaker 4113 are connected to the voice processing unit 4111, which performs processing of a call with a party connected via wireless communication by the wireless communication unit 4102. The voice processing unit 4111 is further capable of performing processing for a voice input operation.

A battery 2411 is built in the segment 2190, and a battery 2421 is built in the segment 2210. The batteries 2411 and 2421 are composed of, for example, all-solid-state batteries, and supply driving power to the circuit in the segment 2170. The circuit in the segment 2170 and the batteries 2411 and 2421 are connected via the flexible circuit board 2400 (FIG. 19). Although not illustrated in FIG. 20, the segment 2170 includes terminals for charging the batteries 2411 and 2421. Electronic components other than the batteries 2411 and 2421 may be arranged in the segments 2190 and 2210. For example, the segments 2190 and 2210 may include a circuit that controls charging and discharging of the batteries 2411 and 2421.

(Example of Arrangement of Components in Segment)

FIG. 19 shows the configuration of the segments 2170 to 2210 in which electronic components and the like are arranged and the buckle portion 2300 coupled with the segment 2170. The segments 2170 to 2210 are shown with a lid member (not illustrated) opened. The chassis constituting each of the segments 2170 to 2210 is formed of a metal such as stainless steel.

Inside the segments 2170 to 2210, the flexible circuit board 2400, electronic components mounted to the flexible circuit board 2400, and the like are arranged. FIG. 19 shows a state in which a first member 2310 and a second member 2320 of the buckle portion 2300 are opened. When the first member 2310 and the second member 2320 are closed, the buckle portion 2300 is arranged in a position overlapping the back surface (the upper side in FIG. 19) of the segment 2170.

The segment 2170 is larger in size than the other segments and houses the electronic components shown in FIG. 20. An inner chassis 2500 made of a transparent resin (or translucent resin) is arranged inside the segment 2170, and the flexible circuit board 2400 and the like are arranged in the inner chassis 2500. A coupling portion 2171 on one side of the segment 2170 is coupled with a coupling portion 2330 of the buckle portion 2300. A coupling portion 2172 on the other side of the segment 2170 is coupled with a coupling portion 2183 of the segment 2180. A coupling portion 2184 of the segment 2180 is coupled with the segment 2190. Further, the segment 2200 is coupled next to the segment 2190, and the segment 2210 is coupled next to the segment 2200. In each of the coupling portions, two segments are coupled using a connecting pin (not illustrated).

On the front surface of the segment 2170, the slit 2173 is formed. The plurality of light-emitting diodes constituting the display 4108 are arranged in the inner chassis 2500 formed close to the slit 2173 and made of a transparent or translucent resin. Accordingly, the user can check the light emission or blinking of the light-emitting diodes through the slit 2173 of the segment 2170. By the light emission or blinking of such the light-emitting diodes, various states such as an incoming call and e-mail reception are notified. Inside the inner chassis 2500 close to the slit 2173, the antennas 4103, 4105, and 4107 are arranged. Accordingly, each of the antennas 4103, 4105, and 4107 is capable of maintaining a good communication state with the outside of the metal segment 2170.

A first portion 2401 of the flexible circuit board 2400 is arranged in the inner chassis 2500 of the segment 2170. The first portion 2401 of the flexible circuit board 2400 is connected to a rigid board 2440 via a connection member 2431. Various electronic components 2441, 2442, 2443, . . . are connected to the rigid board 2440. The electronic components 2441, 2442, 2443, . . . correspond to the processing units 4101, shown in FIG. 20, to 4113.

The segment 2190 and the segment 2210 have a size enough to house the batteries 2411 and 2421. The segment 2180 and the segment 2200 are smaller in size than the segments 2190 and 2210. A second portion 2402 of the flexible circuit board 2400 is meanderingly arranged in the segment 2180. The battery 2411 is connected to a third portion 2403 of the flexible circuit board 2400. A fourth portion 2404 of the flexible circuit board 2400 is meanderingly arranged in the segment 2200. The battery 2421 is connected to a fifth portion 2405 of the flexible circuit board 2400. Details of the meandering state of the flexible circuit board 2400 will be described with reference to FIG. 21.

(Arrangement State of Flexible Circuit Board)

Figure 21:
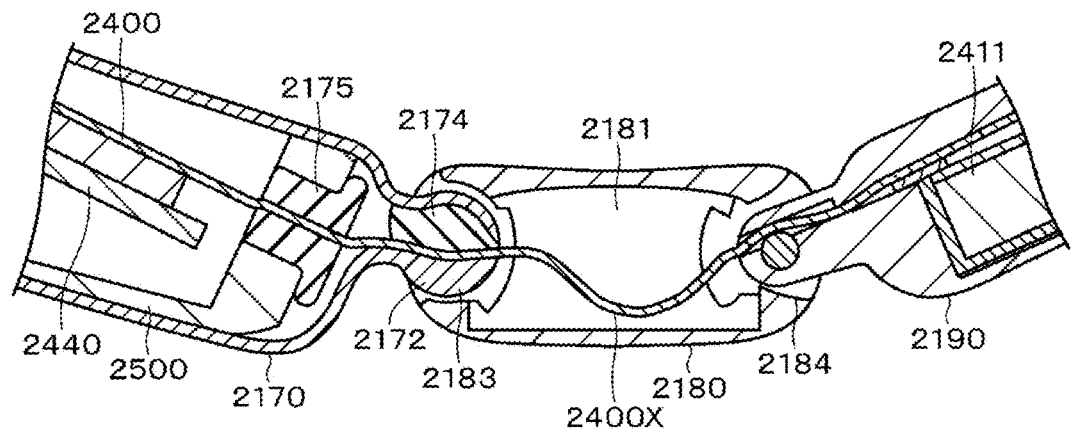
FIG. 21 is a cross-sectional view for explaining a meandering state of a flexible circuit board.

FIG. 21 shows a cross section of a state in which the flexible circuit board 2400 is arranged inside the segments 2170 to 2190. The flexible circuit board 2400 is arranged continuously inside of the segments 2170 to 2190. As shown in FIG. 21, the flexible circuit board 2400 passes through inside of the coupling portion 2171 of the segment 2170 and the coupling portion 2183 of the segment 2180. In this case, in the coupling portion 2171, a waterproof member 2174 is arranged in a position where the flexible circuit board 2400 passes through, thereby blocking water from entering the inside of the segment 2170. In addition, a waterproof member 2175 is arranged in the inner chassis 2500 of the segment 2170.

Waterproof members 2181 and 2182 (refer to FIG. 18) are arranged inside the segment 2180, thereby blocking water from entering the inside of the segment 2180. Each of the waterproof members 2174, 2175, 2181, and 2182 is molded, for example, of a relatively soft resin, and a gap between the inside of the segment 2180 and the flexible circuit board 2400 is filled. Then, the flexible circuit board 2400 is meanderingly arranged inside the segment 2180. That is, a curved meandering portion 2400X is formed on the flexible circuit board 2400 inside the segment 2180.

The meandering portion 2400X of the flexible circuit board 2400 functions so as to prevent the flexible circuit board 2400 from being damaged. For example, even when the coupling portion between the segment 2180 and the segment 2170 is largely bent, the meandering portion 2400X of the flexible circuit board 2400 linearly extends, so that the flexible circuit board 2400 is not pulled. Accordingly, a problem such as breakage of the circuit pattern in the flexible circuit board 2400 will not occur.

The meandering portion 2400X shown in FIG. 21 is an example, and other shapes may be adopted. That is, the meandering portion 2400X may have various meandering shapes such as an S shape, a V shape, a U shape, a Z shape, a curved shape, a semicircular shape, and a polygonal line shape.

The present invention can be applied in a case where an all-solid-state battery is used as the battery 2411 described above.

(Battery Arrangement State)

Figure 22:
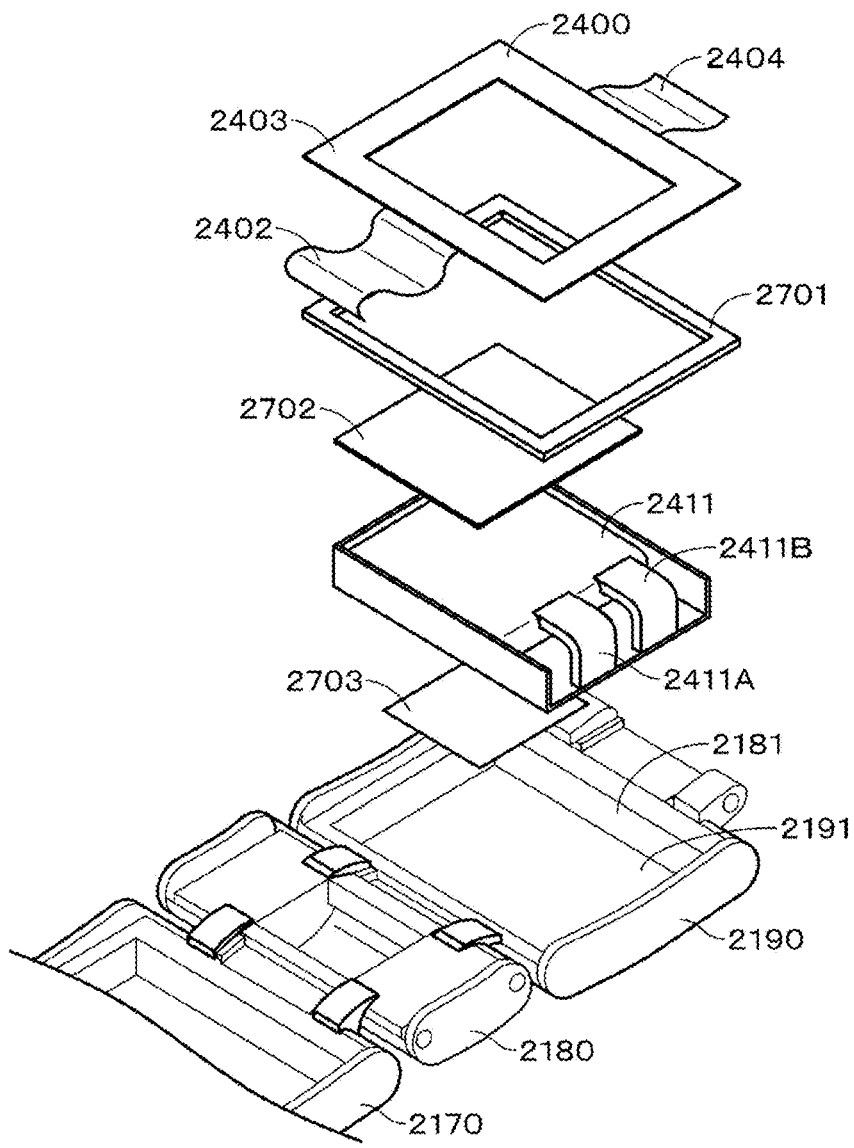
FIG. 22 is a perspective view showing a state in which a battery is arranged in a segment.

FIG. 22 shows a state in which the battery 2411 is arranged in the segment 2190. The configuration in which the battery 2421 is arranged in the segment 2210 is also the same. The battery 2411 is arranged in a battery arrangement portion 2191 inside the segment 2190. At this time, an adhesive sheet 2703 is arranged between the battery arrangement portion 2191 and the battery 2411.

Further, the third portion 2403 of the flexible circuit board 2400 is adhered to the front surface (the upper side in FIG. 22) of the battery 2411 via an adhesive sheet 2701. Via the adhesion using the adhesive sheet 2701, electrodes 2411A and 2411B on the surface of the battery 2411 are connected with the circuit pattern in the flexible circuit board 2400. Further, the surface of the battery 2411 is adhered with a lid (not illustrated) of the segment 2190 via an adhesive sheet 2702. Here, the adhesive sheet 2701 is configured to block the periphery of the surface of the battery 2411. Accordingly, the adhesive sheet 2701 functions as a waterproof member of the battery 2411 in the segment 2190. Note that the battery may be arranged in another segment of the band type electronic device 2000.

The above-mentioned smartwatch is capable of performing notification such as e-mails and incoming calls, record of logs of user's action history, call, and the like. The smartwatch includes a function as a contactless IC card, and is capable of performing settlement and authentication using the contactless IC card. Moreover, a watch same as a conventional watch can be used for the watch main body of the smartwatch of this example, thereby providing a watch excellent in design. In addition, the plurality of segments have a waterproof structure and are arranged meanderingly on the flexible circuit board, thereby having an effect of not cutting the circuit pattern. Further, the antenna in the metal segment 2170 is arranged in the vicinity of the slit of the segment 2170, thereby realizing good transmission and reception.

"Eyeglass Type Terminal as Application Example"

Hereinafter, application examples in which the present invention is applied to eyeglass type terminals represented by a type of head-mounted displays (HMD) will be described.

The eyeglass type terminal described below is capable of displaying information such as text, symbols, and images superimposed on the landscape in front of the user. That is, a lightweight and thin image display device display module dedicated to the transmissive eyeglass type terminal is mounted.

This image display device includes an optical engine and a hologram light guide plate. The optical engine emits image light such as images and texts using a micro display lens. This image light enters the hologram light guide plate. The hologram light guide plate has a hologram optical element incorporated at both end portions of a transparent plate, thereby transmitting image light from the optical engine to the user's eyes by propagating it through a very thin transparent plate of such as 1 mm in thickness. Such configuration realizes a lens having a thickness of 3 mm (including a protective plate around the light guide plate) with a transmittance of 85%, for example. Such eyeglass type terminal allows real-time viewing of results of the players and teams during watching a sport game, and allows display of a travel guide at a travel destination.

Figure 23:
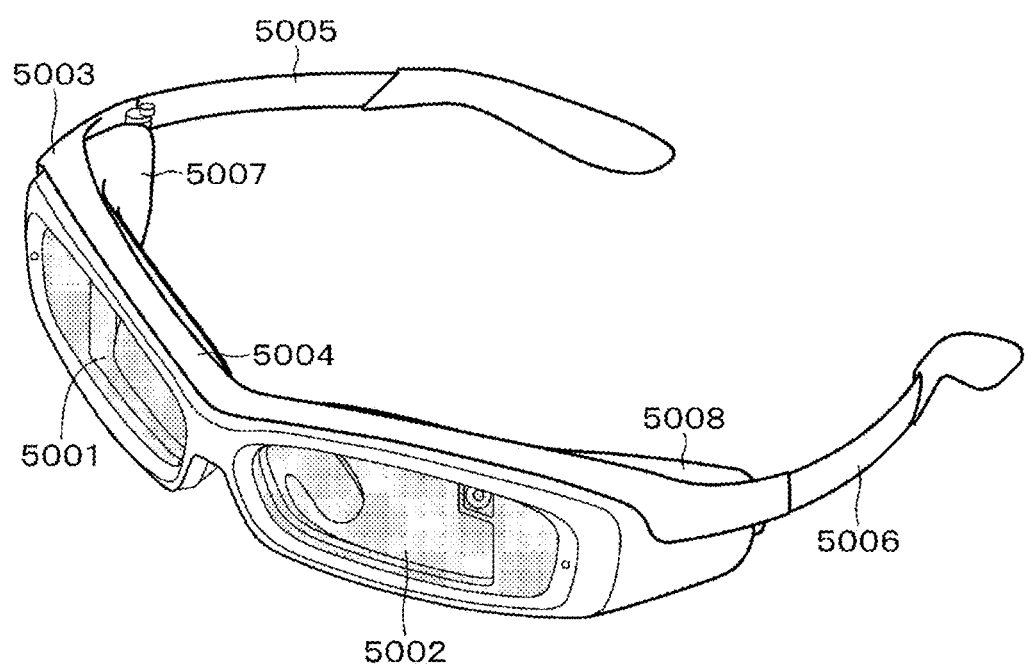
FIG. 23 is a perspective view of an example of an eyeglass type terminal as an application example of the present invention.

A specific example of the eyeglass type terminal includes an image display unit having an eyeglass type configuration as shown in FIG. 23. That is, similar to the normal eyeglass, it has a frame 5003 for retaining a right image display unit 5001 and a left image display unit 5002 in front of the eyes. The frame 5003 is composed of a front portion 5004 arranged on the front of the observer and two temple portions 5005 and 5006 pivotally attached to the both ends of the front portion 5004 via hinges. The frame 5003 is made of the same material as the material constituting ordinary glasses, such as metal, alloy, plastic, and a combination thereof. Note that a headphone portion may be provided.

The right image display unit 5001 and the left image display unit 5002 are arranged so as to be positioned in front of the user's right eye and in front of the user's left eye, respectively. The temple portions 5005 and 5006 retain the right image display unit 5001 and the left image display unit 5002, respectively, on the user's head. A right display driving unit 5007 is arranged inside the temple portion 5005 at a connection portion between the front portion 5004 and the temple portion 5005. A left display driving unit 5008 is arranged inside the temple portion 5006 at a connection portion between the front portion 5004 and the temple portion 5006.

Although not illustrated in FIG. 23, a battery, an acceleration sensor, a gyroscope, an electronic compass, a microphone/speaker, and the like are mounted on the frame 5003. Further, an imaging device is attached, thereby allowing shooting of still images/moving images.

Furthermore, a controller connected with the eyeglass portion via, for example, a wireless or wired interface is included. The controller is provided with a touch sensor, various buttons, a speaker, a microphone, and the like. Furthermore, it has a linkage function with smartphones. For example, it is possible to utilize the GPS function of a smartphone to provide information in response to the user's situation. Hereinafter, the image display device (the right image display unit 5001 or the left image display unit 5002) will mainly be described.

Figure 24:
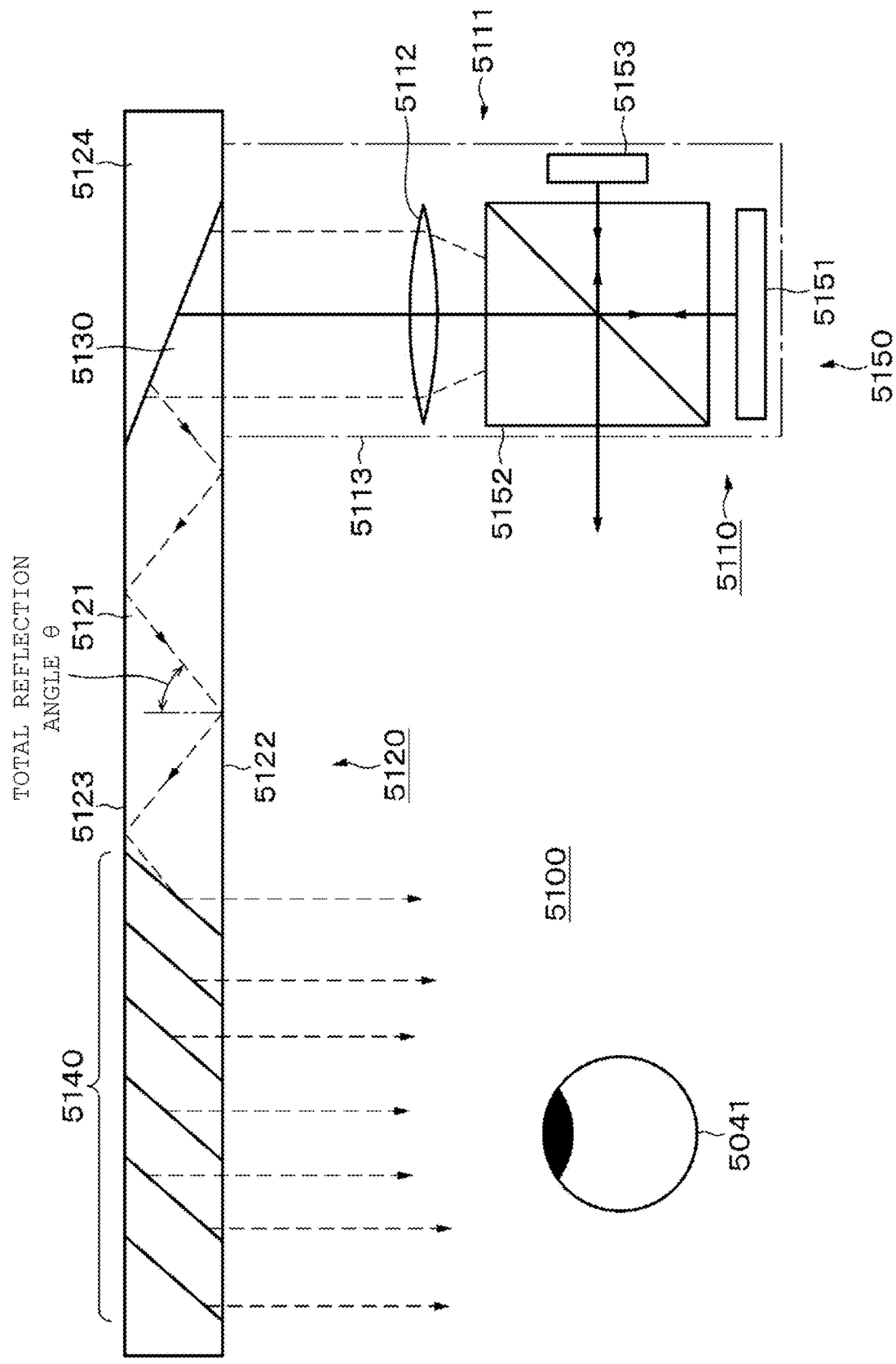
FIG. 24 is a conceptual diagram of a first example of an image display device of an eyeglass type terminal.

FIG. 24 shows a conceptual diagram of the first example of the image display device (the right image display unit 5001 or the left image display unit 5002) of the eyeglass type terminal. The image display device in the eyeglass type terminal of the first example includes a first configuration of an image generation device and a first configuration of an optical device.

An image display device 5100 includes an image generation device 5110 including an image generation device of the first configuration and an optical device (light guide means) 5120 where light emitted from the image generation device 5110 enters, is guided, and is emitted towards a pupil 5041 of the observer. The optical device 5120 is attached to the image generation device 5110.

The optical device 5120 is composed of the optical device of the first configuration, and includes: a light guide plate 5121 in which light entering from the image generation device 5110 propagates through the inside by total reflection and is then emitted towards the pupil 5041 of the observer; a first deflection means 5130 for deflecting light entering the light guide plate 5121 so that the light entering the light guide plate 5121 is totally reflected inside the light guide plate 5121; and a second deflection means 5140 for deflecting for a plurality of times the light propagated through the inside of the light guide plate 5121 by total reflection in order to emit from the light guide plate 5121 the light propagated through the inside of the light guide plate 5121 by total reflection.

The first deflection means 5130 and the second deflection means 5140 are placed inside the light guide plate 5121. The first deflection means 5130 reflects the light entering the light guide plate 5121, and the second deflection means 5140 transmits and reflects for a plurality of times the light propagated through the inside of the light guide plate 5121 by total reflection. That is, the first deflection means 5130 functions as a reflecting mirror and the second deflection means 5140 functions as a semi-transmissive mirror. More specifically, the first deflection means 5130 provided inside the light guide plate 5121 is made of aluminum and is composed of a light reflecting film (a kind of mirror) that reflects light entering the light guide plate 5121. The second deflection means 5140 provided inside the light guide plate 5121, on the other hand, is composed of a multilayered laminate structure in which a multitude of dielectric laminated films are laminated. The dielectric laminated film is composed of, for example, a $TiO_2$ film as a high dielectric constant material and a $SiO_2$ film as a low dielectric constant material. Although six layers of dielectric laminated films are illustrated in the figure, the present invention is not limited thereto.

A thin piece made of the same material as the material constituting the light guide plate 5121 is sandwiched between the dielectric laminated film and the dielectric laminated film. In the first deflection means 5130, parallel light entering the light guide plate 5121 is reflected (or diffracted) such that the parallel light entering the light guide plate 5121 is totally reflected inside the light guide plate 5121. In the second deflection means 5140, on the other hand, parallel light propagated through the inside of the light guide plate 5121 by total reflection is reflected (or diffracted) for a plurality of times, and is emitted from the light guide plate 5121 in a state of parallel light.

As for the first deflection means 5130, by cutting out a portion 5124 of the light guide plate 5121 where the first deflection means 5130 is provided, a slope on which the first deflection means 5130 is to be formed is provided on the light guide plate 5121. After vacuum deposition of a light reflection film onto the slope, the cut out portion 5124 of the light guide plate 5121 may be adhered to the first deflection means 5130. As for the second deflection means 5140, a multilayered laminate structure is prepared in which a multitude of the same material (for example, glass) as the material constituting the light guide plate 5121 and dielectric laminated films (that can be formed by vacuum deposition, for example) are laminated, a portion 5125 of the light guide plate 5121 where the second deflection means 5140 is provided is cut out to form a slope, and the multilayered laminate structure may be adhered to the slope and polished to adjust the outer shape. Thus, it is possible to obtain the optical device 5120 in which the first deflection means 5130 and the second deflection means 5140 are provided inside the light guide plate 5121.

The light guide plate 5121 made of optical glass and plastic material has two parallel surfaces (a first surface 5122 and a second surface 5123) extending in parallel with an axis of the light guide plate 5121. The first surface 5122 and the second surface 5123 are opposed to each other. Then, parallel light enters from the first surface 5122 corresponding to a light entering surface, propagates through the inside by total reflection, and then is emitted from the first surface 5122 corresponding to a light emitting surface.

The image generation device 5110 includes an image formation device 5111 including the image generation device of the first configuration and having a plurality of pixels arrayed in a two-dimensional matrix, and a collimator optical system 5112 that collimates and emits light having been emitted from each of the pixels of the image formation device 5111.

Here, the image formation device 5111 includes a reflective spatial light modulation device 5150 and a light source 5153 constituted by a light-emitting diode that emits white light. More specifically, the reflective spatial light modulation device 5150 includes a liquid crystal display device (LCD) 5151 made of liquid crystal on silicon (LCOS) as a light valve, and a polarization beam splitter 5152 that reflects a part of light from the light source 5153 and guides it to the liquid crystal display device 5151 and passes through a part of light reflected by the liquid crystal display device 5151 and guides it to the collimator optical system 5112. Note that the LCD is not limited to those of the LCOS type.

The liquid crystal display device 5151 includes a plurality of (320×240, for example) pixels arrayed in a two-dimensional matrix. The polarization beam splitter 5152 has a well-known configuration and structure. Non-polarized light emitted from the light source 5153 collides with the polarization beam splitter 5152. In the polarization beam splitter 5152, the P polarization component passes through and is emitted outside the system. On the other hand, the S polarization component is reflected by the polarization beam splitter 5152, enters the liquid crystal display device 5151, is reflected inside the liquid crystal display device 5151, and is emitted from the liquid crystal display device 5151. Among the beams of light emitted from the liquid crystal display device 5151, a beam of light emitted from a pixel displaying "white" includes a multitude of P polarization components, and a beam of light emitted from a pixel displaying "black" includes a multitude of S polarization components. Accordingly, among the beams of light emitted from the liquid crystal display device 5151 and colliding with the polarization beam splitter 5152, the P polarization component passes through the polarization beam splitter 5152 and is guided to the collimator optical system 5112.

On the other hand, the S polarization component is reflected by the polarization beam splitter 5152 and returned to the light source 5153. The liquid crystal display device 5151 includes a plurality of (320×240, for example) pixels (the number of liquid crystal cells is three times the number of pixels) arrayed in a two-dimensional matrix, for example. The collimator optical system 112 includes, for example, a convex lens, and in order to generate parallel light, the image formation device 5111 (more specifically, the liquid crystal display device 5151) is arranged in the portion (position) of the focal length in the collimator optical system 5112. In addition, one pixel is constituted by a red light-emitting sub-pixel that emits red light, a green light-emitting sub-pixel that emits green light, and a blue light-emitting sub-pixel that emits blue light.

Furthermore, in the eyeglass type terminal including the preferable configuration and structure described above, the image display device includes the image generation device and the optical device (light guide means) where light emitted from the image generation device enters, is guided, and is emitted towards the pupil of the observer. The optical device can be configured to be attached to, for example, the image generation device.

Figure 25:
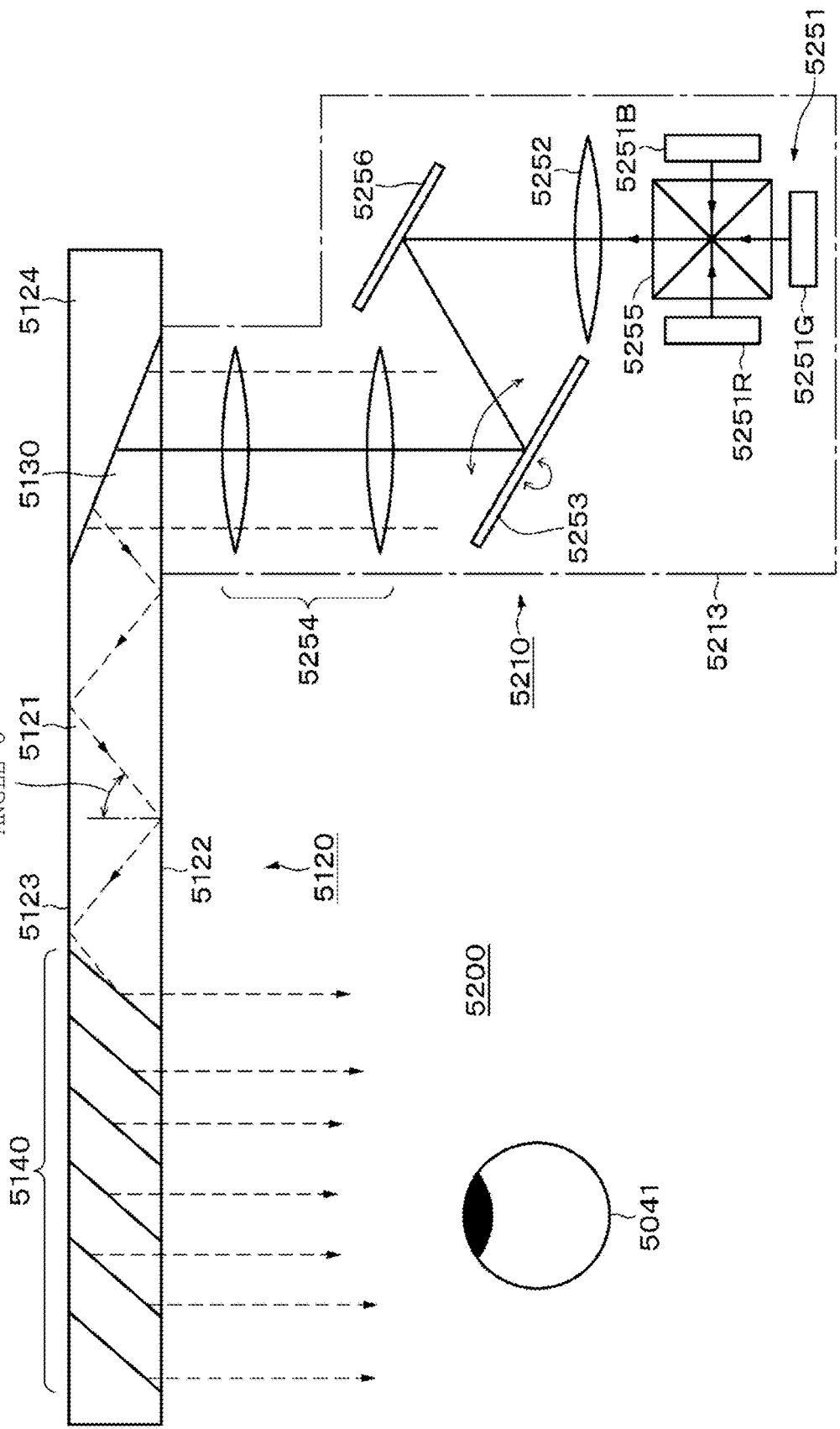
FIG. 25 is a conceptual diagram of a second example of an image display device.

The second example is a variation of the first example. FIG. 25 shows a conceptual diagram of an image display device 5200 in the eyeglass type terminal of the second example. In the second example, an image generation device 5210 includes an image generation device of the second configuration. Specifically, it includes a light source 5251, a collimator optical system 5252 that collimates light emitted from the light source 5251, a scanning means 5253 that scans the parallel light emitted from the collimator optical system 5252, and a relay optical system 5254 that relays and emits the parallel light scanned by the scanning means 5253. The image generation device 5210 is covered with a cover 5213.

The light source 5251 is constituted by a red light-emitting element 5251R that emits red light, a green light-emitting element 5251G that emits green light, and a blue light-emitting element 5251B that emits blue light, and each of the light-emitting elements is composed of a semiconductor laser element. Light of the three primary colors emitted from the light source 5251 passes through a cross prism 5255 to perform color synthesis, the optical path is unified, enters the collimator optical system 5252 having a positive optical power as a whole, and is emitted as collimated light. The parallel light is reflected by a total reflection mirror 5256, makes a micromirror rotatable in a two-dimensional direction, undergoes horizontal scanning and vertical scanning by the scanning means 5253 composed of a micro electro mechanical system (MEMS) capable of two-dimensionally scanning the entering parallel light, and is made a kind of two-dimensional image, thereby generating a virtual pixel. Then, light from the virtual pixel passes through the relay optical system 5254 composed of a well-known relay optical system, and a collimated light flux enters the optical device 5120.

Since the optical device 5120 where a light beam collimated by the relay optical system 5254 enters, is guided, and is emitted has the same configuration and structure as those of the optical device described in the first example, a detailed explanation is omitted. Also, since the eyeglass type terminal of the second example has substantially the same configuration and structure as those of the eyeglass type terminal of the first example except that the image generation device 5210 is different, as described above, a detailed explanation is omitted.

Figure 26A:
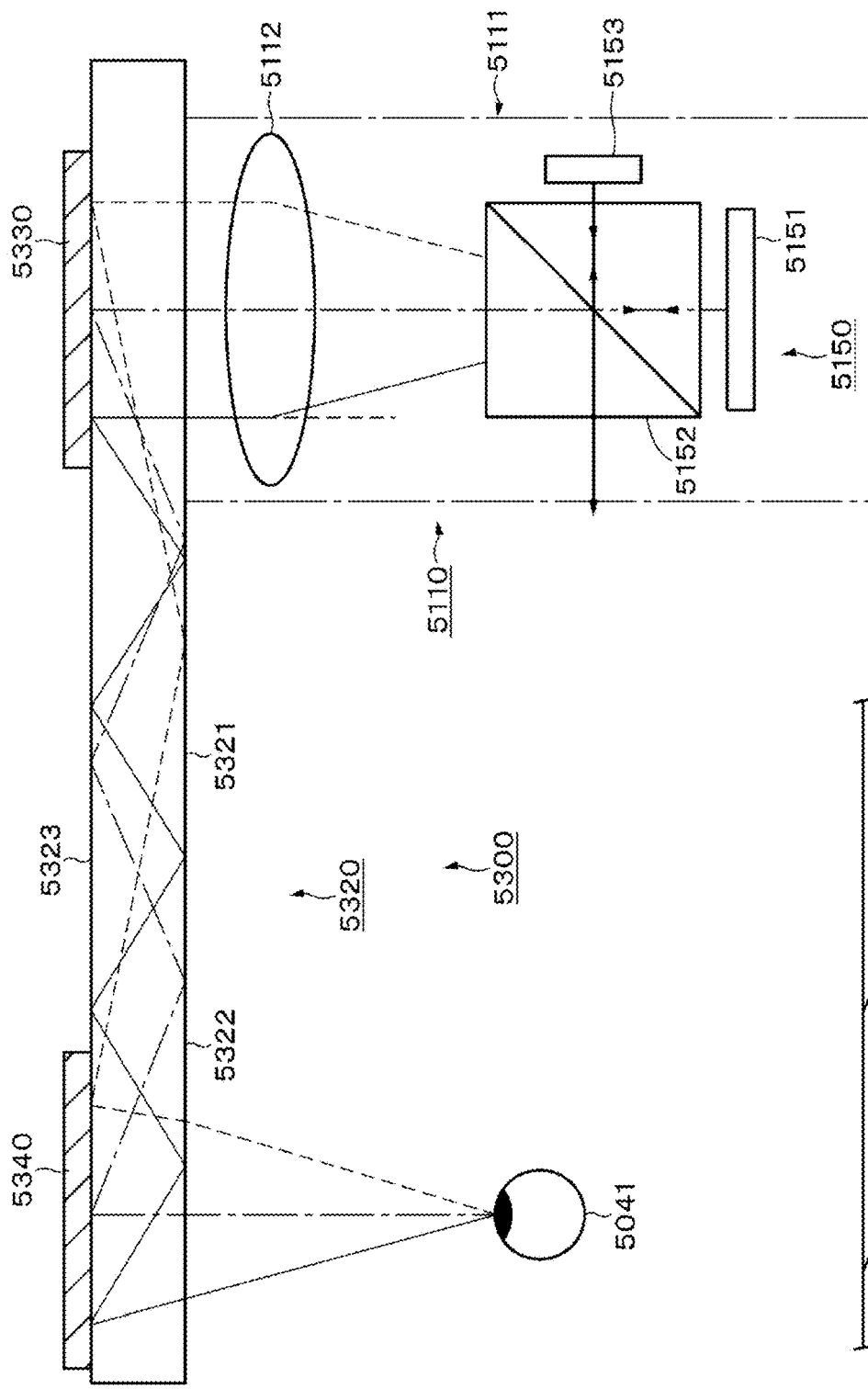
FIG. 26A is a conceptual diagram of a third example of an image display device.
Figure 26B:
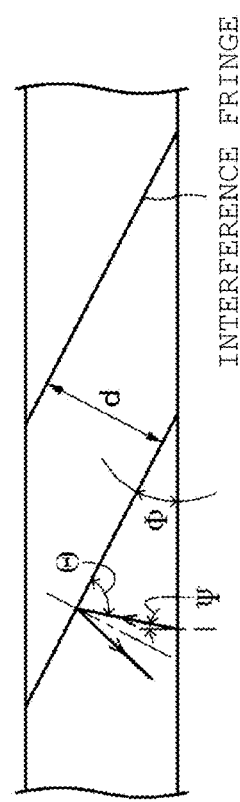
FIG. 26B is a schematic cross-sectional view showing a part of a reflection type volume hologram diffraction grating in an enlarged manner.

The third example is also a variation of the first example. FIG. 26A shows a conceptual diagram of an image display device 5300 in the eyeglass type terminal of the third example. FIG. 26B shows a schematic cross-sectional view showing a part of a reflection type volume hologram diffraction grating in an enlarged manner. In the third example, the image generation device 5110 has the same configuration as that of the first example. Further, an optical device (light guide means) 5320 has the same basic configuration as that of the optical device 5120 of the first example except that the configuration and structure of the first deflection means and the second deflection means are different.

That is, similarly to the optical device 5120 of the first example, it includes: a light guide plate 5321 in which light entering from the image generation device 5110 propagates through the inside by total reflection and is then emitted towards the pupil 5041 of the observer; a first deflection means 5330 for deflecting light entering the light guide plate 5321 so that the light entering the light guide plate 5321 is totally reflected inside the light guide plate 5321; and a second deflection means 5340 for deflecting for a plurality of times the light propagated through the inside of the light guide plate 5321 by total reflection in order to emit from the light guide plate 5321 the light propagated through the inside of the light guide plate 5321 by total reflection.

In the third example, the optical device 5320 is composed of the optical device of the second configuration. That is, the first deflection means and the second deflection means are placed on the surface of the light guide plate 5321 (specifically, a second surface 5323 of the light guide plate 5321). The first deflection means diffracts light entering the light guide plate 5321, and the second deflection means diffracts for a plurality of times light propagated through the inside of the light guide plate 5321 by total reflection. Here, the first deflection means and the second deflection means are composed of a diffraction grating element, specifically a reflection type diffraction grating element, and more specifically a reflection type volume hologram diffraction grating. In the following description, the first deflection means composed of the reflection type volume hologram diffraction grating will be referred to as a "first diffraction grating member 5330" for the sake of convenience and the second deflection means composed of the reflection type volume hologram diffraction grating will be referred to as a "second diffraction grating member 5340".

Figure 27:
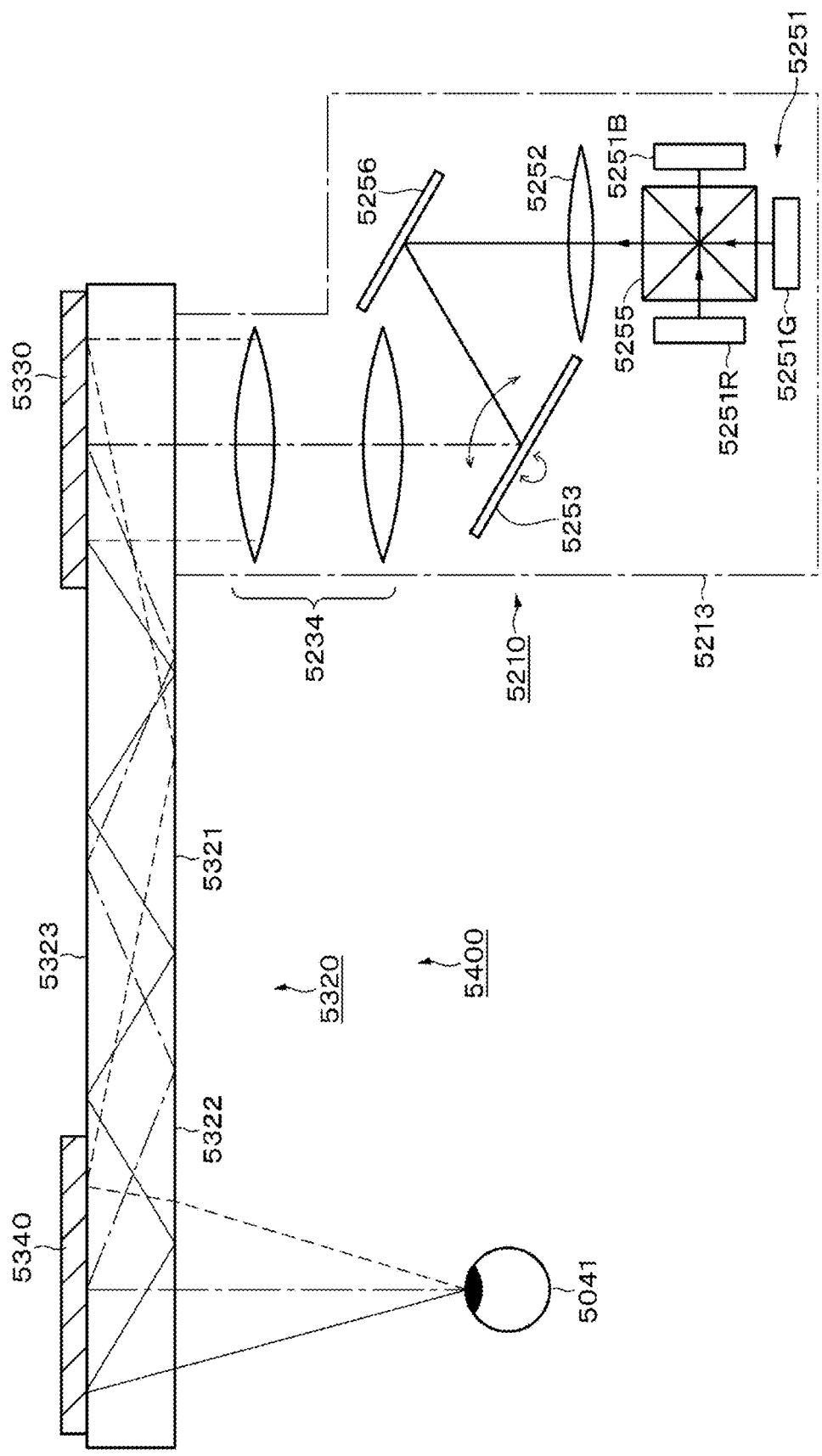
FIG. 27 is a conceptual diagram of a fourth example of an image display device.

In the third example or the fourth example to be described later, the first diffraction grating member 5330 and the second diffraction grating member 5340 have a configuration in which diffraction grating layers of P layer composed of a reflection type volume hologram diffraction grating are laminated in order to correspond to diffraction reflection of P kinds of light having wavelength bands (or wavelengths) of different P types (specifically, P=3, and the three kinds of red, green, and blue). An interference fringe corresponding to one type of wavelength band (or wavelength) is formed in each of the diffraction grating layers composed of a photopolymer material, and is prepared by a conventional method. More specifically, the first diffraction grating member 5330 and the second diffraction grating member 5340 have a configuration in which a diffraction grating layer that diffracts and reflects red light, a diffraction grating layer that diffracts and reflects green light, and a diffraction grating layer that diffracts and reflects blue light are laminated. The pitch of the interference fringe formed on the diffraction grating layer (diffraction optical element) is constant, and the interference fringe is linear and parallel to the Z axis direction. The axial direction of the first diffraction grating member 5330 and the second diffraction grating member 5340 is defined as the Y axis direction, and the normal direction is defined as the X axis direction. In FIG. 26A and FIG. 27, the first diffraction grating member 5330 and the second diffraction grating member 5340 are shown as one layer. By adopting such a structure, it is possible to increase the diffraction efficiency, increase the diffraction acceptance angle, and optimize the diffraction angle at the time light having each of the wavelength bands (or wavelength) is diffracted and reflected by the first diffraction grating member 5330 and the second diffraction grating member 5340.

FIG. 26B shows an enlarged schematic partial cross-sectional view of the reflection type volume hologram diffraction grating. In the reflection type volume hologram diffraction grating, an interference fringe having an inclination angle φ is formed. Here, the inclination angle φ refers to the angle formed by the surface of the reflection type volume hologram diffraction grating and the interference fringe. The interference fringe is formed from the inside to the surface of the reflection type volume hologram diffraction grating. The interference fringe satisfies the Bragg condition. Here, the Bragg condition refers to a condition that satisfies the following expression (A). In the expression (A), m is a positive integer, λ is a wavelength, d is the pitch of the grating plane (the interval in the normal direction of the virtual plane including the interference fringe), and θ is the complementary angle of the angle entering the interference fringe. In addition, the relationship among θ, the inclination angle φ, and the incident angle ψ when light enters the diffraction grating member at an incident angle ψ is as shown in expression (B).

$$m \cdot \lambda = 2 \cdot d \cdot \sin(\theta) \quad (A)$$

$$\theta = 90° - (\varphi + \psi) \quad (B)$$

As described above, the first diffraction grating member 5330 is placed (adhered) on the second surface 5323 of the light guide plate 5321, and diffracts and reflects this parallel light entering the light guide plate 5321 so that this parallel light entering the light guide plate 5321 from a first surface 5322 is totally reflected inside the light guide plate 5321. Furthermore, as described above, the second diffraction grating member 5340 is placed (adhered) on the second surface 5323 of the light guide plate 5321, and diffracts and reflects for a plurality of times this parallel light propagated through the inside of the light guide plate 5321 by total reflection and emits it from the first surface 5322 as parallel light from the light guide plate 5321.

Even in the light guide plate 5321, parallel light of the three colors of red, green, and blue propagate through the inside by total reflection, and then is emitted. At this time, since the light guide plate 5321 is thin and the optical path proceeding the inside of the light guide plate 5321 is long, the number of total reflections up to the second diffraction grating member 5340 is different depending on each angle of view. More specifically, among the parallel light entering the light guide plate 5321, the number of reflections of the parallel light entering at an angle in a direction getting close to the second diffraction grating member 5340 is smaller than the number of reflections of the parallel light entering the light guide plate 5321 at an angle in a direction getting away from the second diffraction grating member 5340. This is because the angle formed by the light propagating through the inside of the light guide plate 5321 and the normal line of the light guide plate 5321 when colliding with the inner surface of the light guide plate 5321 is smaller in the parallel light entering the light guide plate 5321 at an angle in the direction getting close to the second diffraction grating member 5340 than in the parallel light entering the light guide plate 5321 at an angle in the direction opposite thereto, among the parallel light diffracted and reflected by the first diffraction grating member 5330. The shape of the interference fringe formed inside the second diffraction grating member 5340 and the shape of the interference fringe formed inside the first diffraction grating member 5330 are in a relationship symmetrical with respect to a virtual plane perpendicular to the axis of the light guide plate 5321.

Basically, the light guide plate 5321 in the fourth example described later also has the same configuration and structure as those of the light guide plate 5321 described above.

Since the eyeglass type terminal of the third example has substantially the same configuration and structure as those of the eyeglass type terminal of the first example except that the optical device 5320 is different, as described above, a detailed description is omitted.

The fourth example is a variation of the third example. FIG. 27 shows a conceptual diagram of an image display device in the eyeglass type terminal of the fourth example. The light source 5251, the collimator optical system 5252, the scanning means 5253, the relay optical system 5254, and the like in an image display device 5400 of the fourth example has the same configuration and structure as those of the second example. The optical device 5320 in the fourth example has the same configuration and structure as those of the optical device 5320 in the third example. Since the eyeglass type terminal of the fourth example has substantially the same configuration and structure as those of the eyeglass type terminal of the first example except for the differences above, a detailed description is omitted.

"Power Storage System in Vehicle as Application Example"

Figure 28:
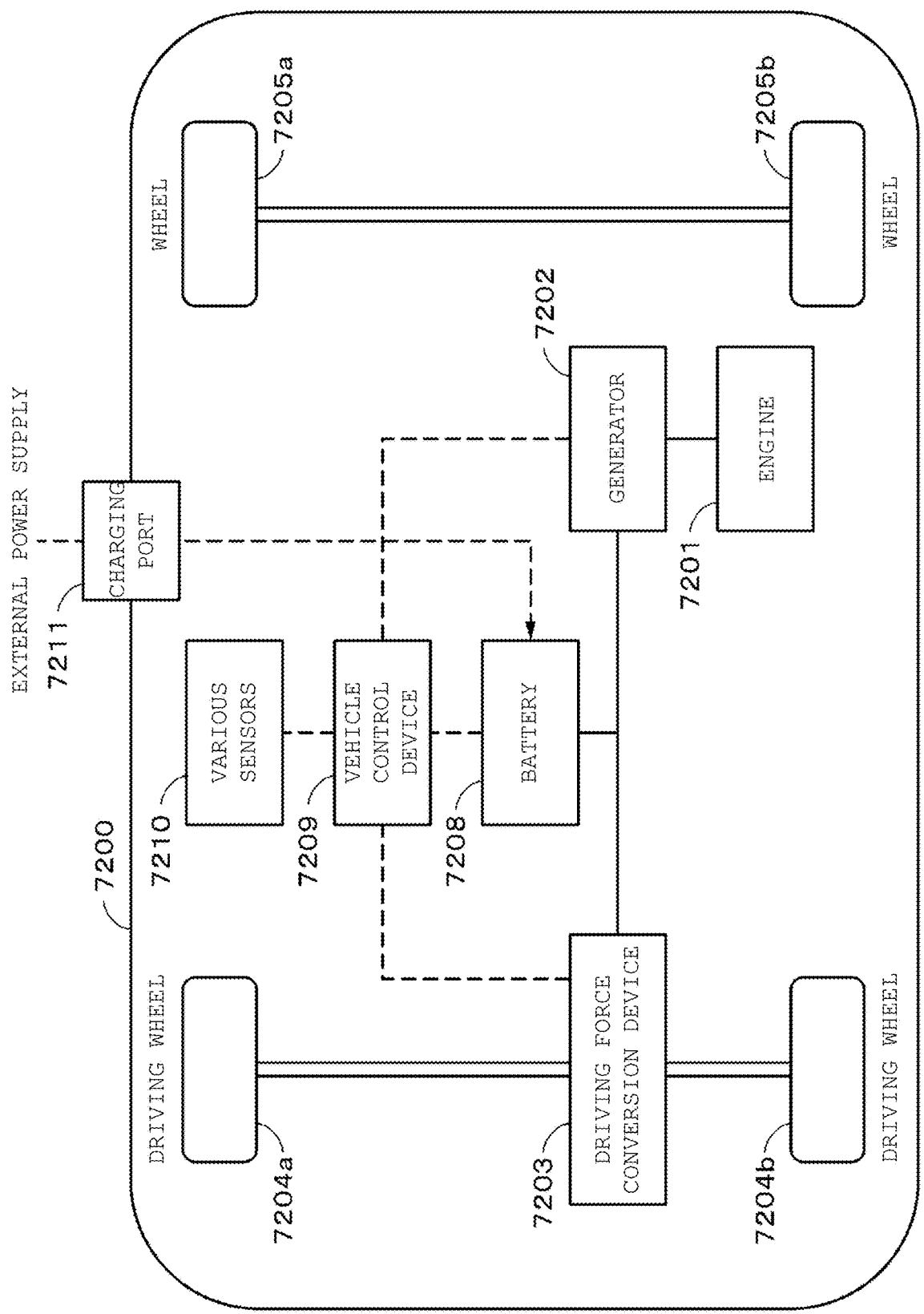
FIG. 28 is a schematic diagram schematically showing an example of a configuration of a hybrid vehicle adopting a series hybrid system to which the present invention is applied.

An example in which the present disclosure is applied to a power storage system for vehicle will be described with reference to FIG. 28. FIG. 28 schematically shows an example of the configuration of a hybrid vehicle adopting a series hybrid system to which the present disclosure is applied. The series hybrid system is a vehicle that runs on an electric power driving force conversion device using electric power generated by a generator driven by an engine or electric power thereof temporarily stored in a battery.

A hybrid vehicle 7200 includes an engine 7201, a generator 7202, an electric power driving force conversion device 7203, a driving wheel 7204a, a driving wheel 7204b, a wheel 7205a, a wheel 7205b, a battery 7208, a vehicle control device 7209, various sensors 7210, and a charging port 7211. The above-described power storage device of the present disclosure is applied to the battery 7208.

The hybrid vehicle 7200 runs with the electric power driving force conversion device 7203 as a power supply. An example of the electric power driving force conversion device 7203 is a motor. The electric power driving force conversion device 7203 operates on the electric power of the battery 7208, and the rotational force of the electric power driving force conversion device 7203 is transmitted to the driving wheels 7204*a* and 7204*b*. It should be noted that by using direct-current-alternating-current (DC-AC) or a reverse conversion (AC-DC conversion) where necessary, the electric power driving force conversion device 7203 can be applied to both an AC motor and a DC motor. The various sensors 7210 control the engine speed via the vehicle control device 7209 and control the opening degree (throttle opening degree) of a throttle valve that is not illustrated. The various sensors 7210 include a speed sensor, an acceleration sensor, and an engine speed sensor.

The rotational force of the engine 7201 is transmitted to the generator 7202, and the power generated by the generator 7202 with the rotational force can be stored in the battery 7208.

When the hybrid vehicle decelerates by a braking mechanism not illustrated, the decelerating resistance force is applied as a rotational force to the electric power driving force conversion device 7203, and the regenerative electric power generated by the electric power driving force conversion device 7203 with the rotational force is stored in the battery 7208.

By being connected to an external power supply of the hybrid vehicle, the battery 7208 is capable of receiving power supply from the external power supply with the charging port 211 as an input port and also storing the received power.

Although not illustrated, it may include an information processing device that performs information processing related to vehicle control based on information on the secondary battery. Examples of such information processing device include an information processing device that displays the remaining battery level based on information on the remaining amount of the battery, for example.

The above explanation has used an example of a series hybrid vehicle that runs with a motor using electric power generated by the generator driven by the engine or the electric power thereof temporarily stored in the battery.

However, the present disclosure is also effectively applicable to a parallel hybrid vehicle in which the both outputs of the engine and the motor are driving sources and the three modes of traveling only with the engine, traveling only with the motor, and traveling with the engine and the motor are appropriately switched at the time of use. Furthermore, the present disclosure is also effectively applicable to a so-called electric vehicle that runs on drive only by a driving motor without using an engine.

An example of the hybrid vehicle 7200 to which the invention according to the present disclosure can be applied has been described above. The invention according to the present disclosure can be preferably applied to the battery 7208 among the above-described configuration. Specifically, deterioration of the battery can be prevented by using an all-solid-state battery as the battery 7208 according to the present invention as the charging and discharging device.

"Power Storage System in Residential House as Application Example"

Figure 29:
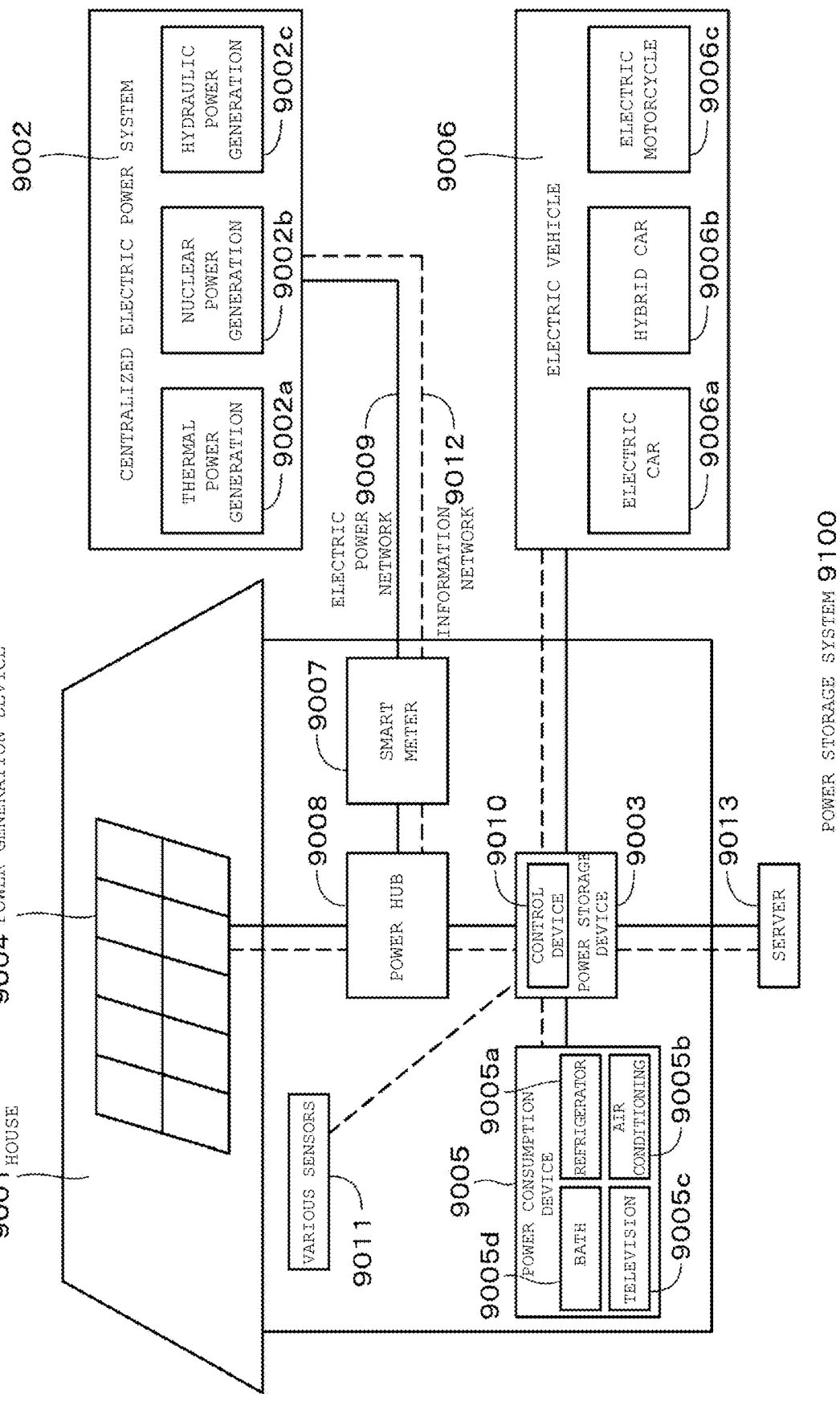
FIG. 29 is a schematic diagram schematically showing an example of a configuration of a power storage system for a residential house to which the present invention is applied.

An example in which the present disclosure is applied to a power storage system for residential house will be described with reference to FIG. 29. For example, in a power storage system 9100 for a residential house 9001, electric power is supplied to a power storage device 9003 from a centralized electric power system 9002 such as a thermal power generation 9002*a*, a nuclear power generation 9002*b*, and a hydraulic power generation 9002*c* via an electric power network 9009, an information network 9012, a smart meter 9007, a power hub 9008, and the like. Together with this, power is supplied from an independent power supply such as a domestic power generation device 9004 to the power storage device 9003. The power supplied to the power storage device 9003 is stored. The power to be used in the residential house 9001 is supplied using the power storage device 9003. A similar power storage system can be used for buildings as well as for the residential house 9001.

The residential house 9001 is provided with the power generation device 9004, a power consumption device 9005, the power storage device 9003, a control device 9010 that controls each device, the smart meter 9007, and a sensor 9011 that acquires various types of information. Each of the devices is connected via the electric power network 9009 and the information network 9012. A solar cell, a fuel cell, or the like is used as the power generation device 9004, and the generated power is supplied to the power consumption device 9005 and/or the power storage device 9003. The power consumption device 9005 is a refrigerator 9005*a*, an air conditioning device 9005*b*, a television receiver 9005*c*, a bath 9005*d*, and the like. Furthermore, the power consumption device 9005 includes an electric vehicle 9006. The electric vehicle 9006 is an electric car 9006*a*, a hybrid car 9006*b*, and an electric motorcycle 9006*c*.

The all-solid-state battery of the present disclosure described above is applied to the power storage device 9003. The power storage device 9003 is constituted by a secondary battery or a capacitor. For example, it is constituted by a lithium-ion battery. The lithium ion battery may be of stationary type or may be the one used in the electric vehicle 9006. The smart meter 9007 includes a function of measuring the usage amount of commercial power and sending the measured usage amount to the electric power company. The electric power network 9009 may use any one or a combination of DC power feed, AC power feed, and contactless power feed.

The various sensors 9011 are, for example, a human motion sensor, an illuminance sensor, an object detection sensor, a power consumption sensor, a vibration sensor, a contact sensor, a temperature sensor, an infrared sensor, and the like. The information acquired by the various sensors 9011 is transmitted to the control device 9010. In response to the information from the sensor 9011, the state of the weather, the state of a person, and the like are grasped and the power consumption device 9005 is automatically controlled to minimize the energy consumption. Further, the control device 9010 is capable of transmitting information on the residential house 9001 to an external electric power company or the like via the Internet.

The power hub 9008 performs processing such as branching of the power line and DC/AC conversion. Communication methods of the information network 9012 connected with the control device 9010 include a method using a communication interface such as universal synchronous receiver-transmitter (UART: transmission/reception circuit for asynchronous serial communication), a method of using a sensor network according to a wireless communication standard such as Bluetooth (registered trademark), ZigBee, and Wi-Fi. The Bluetooth (registered trademark) method is applied to multimedia communication and is capable of performing communication of point-to-multipoint connection. ZigBee uses the physical layer of institute of electrical and electronics engineers (IEEE) 802.15.4. IEEE 802.15.4 is the name of a short-distance wireless network standard called personal area network (PAN) or wireless personal area network (WPAN).

The control device 9010 is connected with an external server 9013. The server 9013 may be managed by any of the residential house 9001, an electric power company, or a service provider. The information transmitted and received by the server 9013 is, for example, power consumption information, daily life pattern information, electric power fee, weather information, natural disaster information, and power trade information. These pieces of information may be transmitted from and received to a power consumption device (for example, a television receiver) inside the home, while they may be transmitted from and received to a device (for example, a mobile phone and the like) outside the home. These pieces of information may be displayed on a device having a display function, for example, a television receiver, a mobile phone, a personal digital assistant (PDA), or the like.

The control device 9010 that controls each unit is configured with a central processing unit (CPU), a random access memory (RAM), a read only memory (ROM), and the like, and is stored in the power storage device 9003 in this example. The control device 9010 is connected to the power storage device 9003, the domestic power generation device 9004, the power consumption device 9005, the various sensors 9011, the server 9013, and the information network 9012, and has, for example, a function of adjusting the usage amount of the commercial power and the power generation amount. It may include other functions such as conducting electric power trading in the electric power market.

As described above, it is possible to store in the power storage device 9003 the power generated by the domestic power generation device 9004 (solar power generation, wind power generation) in addition to the power from the centralized electric power system 9002 such as the thermal power 9002a, the nuclear power 9002b, and the hydraulic power 9002c. Accordingly, even if the generated power of the domestic power generation device 9004 fluctuates, it is possible to perform control such that the amount of electric power sent to the outside is made constant or discharged as necessary. For example, it is possible to store the power obtained by photovoltaic power generation in the power storage device 9003, store at night the midnight power, of which the electricity rate is low, in the power storage device 9003, and discharge and use in daytime, in which electricity rate is high, the power stored by the power storage device 9003.

While an example in which the control device 9010 is stored in the power storage device 9003 has been described in this example, it may be stored in the smart meter 9007 or may be configured alone. Furthermore, the power storage system 9100 may be used for a plurality of homes in a collective housing, or may be used for a plurality of single-family houses.

An example of the power storage system 9100 to which the invention according to the present disclosure can be applied has been described above. The present invention can be preferably applied to the power storage device 9003 in the above-described configuration. However, since the present invention is to supply DC power, it is necessary to convert DC power into AC power when supplying it to AC home appliances.

While the embodiments, the variations, and the examples of the present invention have been described above in a specific manner, the present invention is not limited to the above-described embodiments, the variations, and the examples, and various modifications based on the technical idea of the present invention are possible.

For example, the configurations, methods, processes, shapes, materials, numerical values, and the like described in the above-described embodiments, the variations, and the examples are merely examples, and configurations, methods, processes, shapes, materials, numerical values, and the like different from them may be used as necessary. In addition, the chemical formulae of compounds and the like are representative, and are not limited to the listed valences and the like as long as they are common names of the same compounds.

In addition, the configurations, methods, processes, shapes, materials, numerical values, and the like in the above-described embodiments, the variations, and the examples can be combined with each other without departing from the scope of the present invention.

DESCRIPTION OF REFERENCE SYMBOLS

11: exterior battery element
11SA: first end face
11SB: second end face
12: positive electrode terminal
13: negative electrode terminal
14: exterior material
14a: glass state material
14b: crystalline state material
21: positive electrode
21A: positive electrode collector layer
21B: positive electrode active material layer
22, 32: negative electrode
23: solid electrolyte layer
32A: negative electrode collector layer
32B: negative electrode active material layer

The invention claimed is:

1. An all-solid-state battery, comprising:
a battery element; and
an exterior material covering a surface of the battery element, wherein the exterior material includes one or more glass state materials and one or more crystalline state materials,
wherein the one or more crystalline state materials have a grain shape.

2. The all-solid-state battery according to claim 1, wherein the one or more crystalline state materials are dispersed in the one or more glass state materials.

3. The all-solid-state battery according to claim 2, wherein the one or more glass state materials have an average grain size of 10 μm or less.

4. The all-solid-state battery according to claim 2, wherein the exterior material has a glass-transition point.

5. The all-solid-state battery according to claim 2, wherein a volume occupancy of the one or more glass state materials in the exterior material is 30 vol % or more.

6. The all-solid-state battery according to claim 2, wherein a moisture permeability of the exterior material is 1 g/m$^2$/day or less.

7. The all-solid-state battery according to claim 2, wherein an average thickness of the exterior material is 50 μm or less.

8. The all-solid-state battery according to claim 2, wherein the one or more glass state materials contain at least one of B, Bi, Te, P, V, Sn, Pb, and Si.

9. The all-solid-state battery according to claim 2, wherein the one or more crystalline state materials contain at least one of a metal oxide, a metal nitride, and a metal carbide.

10. The all-solid-state battery according to claim 2, wherein the one or more crystalline state materials contain at least one of aluminum oxide, silicon oxide, silicon nitride, aluminum nitride, and silicon carbide.

11. The all-solid-state battery according to claim 2, wherein:
a Li ion conductivity of the exterior material is $1 \times 10^{-8}$ S/cm or less; and
an electric conductivity of the exterior material is $1 \times 10^{-8}$ S/cm or less.

12. The all-solid-state battery according to claim 2, wherein:
the battery element includes a positive electrode layer, a negative electrode layer, and a solid electrolyte layer; and
the positive electrode layer, the negative electrode layer, and the solid electrolyte layer contain at least one of oxide glass and oxide glass ceramics.

13. An electronic device that receives a power supply from the all-solid-state battery according to claim 2.

14. An electronic card that receives a power supply from the all-solid-state battery according to claim 2.

15. A wearable device that receives a power supply from the all-solid-state battery according to claim 2.

16. An electric vehicle, including:
the all-solid-state battery according to claim 2;
a conversion device that receives a power supply from the all-solid-state battery and converts the received power to a driving force for the electric vehicle; and
a control device that performs information processing related to vehicle control based on information related to the all-solid-state battery.

17. An all-solid-state battery, comprising:
a battery element and
an exterior material covering a surface of the battery element, wherein the exterior material includes one or more glass state materials and one or more crystalline state materials,
wherein:
the battery element includes a positive electrode collector layer, a positive electrode active material layer, a solid electrolyte layer, and a negative electrode layer; and
a first end portion of the positive electrode collector layer is exposed from the external material at a first end face of the battery element and a second end portion of the negative electrode layer is exposed from the external material at a second end face of the battery element different from the first end face.

18. An all-solid-state battery, comprising:
a battery element and
an exterior material covering a surface of the battery element, wherein the exterior material includes one or more glass state materials and one or more crystalline state materials,
wherein:
the battery element includes a positive electrode collector layer, a positive electrode active material layer, a solid electrolyte layer, a negative electrode collector layer, and a negative electrode active material layer; and
a first end portion of the positive electrode collector layer is exposed from the external material at a first end face of the battery element and a second end portion of the negative electrode collector layer is exposed from the external material at a second end face of the battery element different from the first end face.

19. The all-solid-state battery according to claim 18, further comprising:
a positive electrode terminal on the first end face where the first end portion of the positive electrode collector layer is exposed; and
a negative electrode terminal on the second end face where the second end portion of the negative electrode collector layer is exposed.

* * * * *